United States Patent
Milbar

(10) Patent No.: US 11,038,622 B2
(45) Date of Patent: Jun. 15, 2021

(54) FM SYSTEM MODES FOR HD RADIO

(71) Applicant: Ibiquity Digital Corporation, Columbia, MD (US)

(72) Inventor: Marek Milbar, Huntingdon Valley, PA (US)

(73) Assignee: Ibiquity Digital Corporation, Columbia, MD (US)

(*) Notice: Subject to any disclaimer, the term of this patent is extended or adjusted under 35 U.S.C. 154(b) by 35 days.

(21) Appl. No.: 16/277,598

(22) Filed: Feb. 15, 2019

(65) Prior Publication Data

US 2019/0260505 A1 Aug. 22, 2019

Related U.S. Application Data

(60) Provisional application No. 62/631,745, filed on Feb. 17, 2018.

(51) Int. Cl.
*H04L 1/00* (2006.01)
*H04H 20/48* (2008.01)
(Continued)

(52) U.S. Cl.
CPC .......... *H04L 1/0041* (2013.01); *H04B 1/04* (2013.01); *H04H 20/30* (2013.01);
(Continued)

(58) Field of Classification Search
CPC ................................................. H04H 2201/18
See application file for complete search history.

(56) References Cited

U.S. PATENT DOCUMENTS 8,774,289 B1 * 7/2014 Lou .................. H04L 1/006 375/259
9,379,918 B1 * 6/2016 Milbar ................. H04L 27/22
(Continued)

FOREIGN PATENT DOCUMENTS

WO      2019161228      8/2019

OTHER PUBLICATIONS

IBiquity Digital. "HD Radio System Planning Parameters for VHF Band II", Rev 1.04. Apr. 18, 2013. http://www.telemidia.puc-rio.br/~rafaeldiniz/public_files/reuniao_ccrd_05062013/SY_TN_3466_BRA%20-%20HD%20Radio%20System%20-%20Planning%20Parameters%20for%20VHF%20Band%20II%20-%20Revision%2001.04.pdf.*

(Continued)

*Primary Examiner* — Steve N Nguyen
(74) *Attorney, Agent, or Firm* — Schwegman Lundberg & Woessner, P.A.

(57) ABSTRACT

Service modes specify how digital content is formatted in sidebands of an FM radio channel. In an improved service mode, encoded bits can be distributed between an in-band encoded component and a cross-band encoded component, where the encoded bits in the in-band encoded component are desynchronized by a specified duration with respect to the encoded bits in the cross-band encoded component. The encoded bits in the in-band encoded component can be allocated into frequency partitions that are used by a legacy service mode, such as MP1 or MP3, which can provide backward compatibility with the legacy service mode. The encoded bits in the cross-band encoded component can be allocated into frequency partitions that are not used by the legacy service mode, and are found in the opposite sideband, compared with the legacy service mode, which can provide time diversity within a single sideband.

18 Claims, 27 Drawing Sheets

(51) Int. Cl.
*H04B 1/04* (2006.01)
*H04H 20/71* (2008.01)
*H04H 20/30* (2008.01)
*H04H 20/42* (2008.01)

(52) U.S. Cl.
CPC .......... *H04H 20/423* (2013.01); *H04H 20/48* (2013.01); *H04H 20/71* (2013.01); *H04H 2201/183* (2013.01)

(56) References Cited

U.S. PATENT DOCUMENTS

| | | | |
|---|---|---|---|
| 2001/0050926 A1 | 12/2001 | Kumar | |
| 2004/0063399 A1* | 4/2004 | Milbar | H03M 13/2732 455/3.01 |
| 2005/0105657 A1* | 5/2005 | Kroeger | H04L 27/261 375/347 |
| 2008/0032624 A1 | 2/2008 | Abraham | |
| 2012/0028567 A1* | 2/2012 | Marko | H04H 20/57 455/3.02 |
| 2016/0182192 A1 | 6/2016 | Milbar et al. | |
| 2017/0214499 A1* | 7/2017 | van Houtum | H04L 5/0007 |

OTHER PUBLICATIONS

IBiquity Digital. "HD Radio Air Interface Design Description Layer 1 FM", Rev. G. Aug. 23, 2011. https://www.nrscstandards.org/standards-and-guidelines/documents/standards/nrsc-5-d/reference-docs/1011s.pdf.*

Peyla, Paul J. "The Structure and Generation of Robust Waveforms for FM In-Band On-Channel Digital Broadcasting". iBiquity Digital Corporation, 2002.*

P. J. Peyla and B. W. Kroeger, "New Service Modes for HD Radio™ Transmission," 2018 IEEE Broadcast Symposium (BTS), Arlington, VA, 2018.*

"HD Radio Air Interface Design Description Layer 1 FM Rev. G (Doc. No. SY-IDD-1011) pp. 1-66", Ibiquity Digital Corporation, (Aug. 23, 2011), 75 pgs.

"HD Radio Air Interface Design Description Layer 1 FM Rev. G (Doc. No. SY-IDD-1011) pp. 67-124", Ibiquity Digital Corporation, (Aug. 23, 2011), 58 pgs.

"International Application Serial No. PCT/US2019/018250, International Search Report dated Apr. 24, 2019", 2 pgs.

"International Application Serial No. PCT/US2019/018250, Written Opinion dated Apr. 24, 2019", 5 pgs.

* cited by examiner

| MP1 (PML) ORIGINAL MAPPING | | | | | MP12 (PXU) TARGET MAPPING | |
|---|---|---|---|---|---|---|
| STARTING SUBCARRIER NUMBER | ENDING SUBCARRIER NUMBER | PM INTERLEAVER PARTITION | INTERLEAVER MATRIX STARTING COLUMN NUMBER | INTERLEAVER MATRIX ENDING COLUMN NUMBER | STARTING SUBCARRIER NUMBER | ENDING SUBCARRIER NUMBER |
| -431 | -414 | 6 | 216 | 251 | 281 | 298 |
| -412 | -395 | 7 | 252 | 287 | 300 | 317 |
| -393 | -376 | 8 | 288 | 323 | 319 | 336 |
| -374 | -357 | 9 | 324 | 359 | 338 | 355 |

Fig. 12

| MP1 (PMU) ORIGINAL MAPPING | | | | | MP12 (PXL) TARGET MAPPING | |
|---|---|---|---|---|---|---|
| STARTING SUBCARRIER NUMBER | ENDING SUBCARRIER NUMBER | PM INTERLEAVER PARTITION | INTERLEAVER MATRIX STARTING COLUMN NUMBER | INTERLEAVER MATRIX ENDING COLUMN NUMBER | STARTING SUBCARRIER NUMBER | ENDING SUBCARRIER NUMBER |
| 357 | 374 | 10 | 360 | 395 | -355 | -338 |
| 376 | 393 | 11 | 396 | 431 | -336 | -319 |
| 395 | 412 | 12 | 432 | 467 | -317 | -300 |
| 414 | 431 | 13 | 468 | 503 | -298 | -281 |

*Fig. 13*

| STARTING | | | ENDING | | DATA TYPE | DEINT. MATRIX | DEINTERLEAVER MATRIX STARTING COLUMN NUMBER | DEINTERLEAVER MATRIX ENDING COLUMN NUMBER |
|---|---|---|---|---|---|---|---|---|
| SUBCARRIER NUMBER | FFT BIN NUMBER | | SUBCARRIER NUMBER | FFT BIN NUMBER | | | | |
| ~~545~~ | ~~L 479~~ | | ~~528~~ | ~~L 496~~ | ERASURE | PM | 0 | 35 |
| ~~526~~ | ~~L 498~~ | | ~~509~~ | ~~L 515~~ | ERASURE | PM | 36 | 71 |
| ~~507~~ | ~~L 517~~ | | ~~490~~ | ~~L 534~~ | ERASURE | PM | 72 | 107 |
| ~~488~~ | ~~L 536~~ | | ~~471~~ | ~~L 553~~ | ERASURE | PM | 108 | 143 |
| ~~469~~ | ~~L 555~~ | | ~~452~~ | ~~L 572~~ | ERASURE | PM | 144 | 179 |
| ~~450~~ | ~~L 574~~ | | ~~433~~ | ~~L 591~~ | ERASURE | PM | 180 | 215 |
| 281 | U 281 | | 298 | U 298 | SOFT DECISION | PM | 216 | 251 |
| 300 | U 300 | | 317 | U 317 | SOFT DECISION | PM | 252 | 287 |
| 319 | U 319 | | 336 | U 336 | SOFT DECISION | PM | 288 | 323 |
| 338 | U 338 | | 355 | U 355 | SOFT DECISION | PM | 324 | 359 |
| 357 | U 357 | | 374 | U 374 | SOFT DECISION | PM | 360 | 395 |
| 376 | U 376 | | 393 | U 393 | SOFT DECISION | PM | 396 | 431 |
| 395 | U 395 | | 412 | U 412 | SOFT DECISION | PM | 432 | 467 |
| 414 | U 414 | | 431 | U 431 | SOFT DECISION | PM | 468 | 503 |
| 433 | U 433 | | 450 | U 450 | SOFT DECISION | PM | 504 | 539 |
| 452 | U 452 | | 469 | U 469 | SOFT DECISION | PM | 540 | 575 |
| 471 | U 471 | | 488 | U 488 | SOFT DECISION | PM | 576 | 611 |
| 490 | U 490 | | 507 | U 507 | SOFT DECISION | PM | 612 | 647 |
| 509 | U 509 | | 526 | U 526 | SOFT DECISION | PM | 648 | 683 |
| 528 | U 528 | | 545 | U 545 | SOFT DECISION | PM | 684 | 719 |

Fig. 14

| STARTING | | ENDING | | DATA TYPE | DEINT. MATRIX | DEINTERLEAVER MATRIX STARTING COLUMN NUMBER | DEINTERLEAVER MATRIX ENDING COLUMN NUMBER |
|---|---|---|---|---|---|---|---|
| SUBCARRIER NUMBER | FFT BIN NUMBER | SUBCARRIER NUMBER | FFT BIN NUMBER | | | | |
| -545 | L 479 | -528 | L 496 | SOFT DECISION | PM | 0 | 35 |
| -526 | L 498 | -509 | L 515 | SOFT DECISION | PM | 36 | 71 |
| -507 | L 517 | -490 | L 534 | SOFT DECISION | PM | 72 | 107 |
| -488 | L 536 | -471 | L 553 | SOFT DECISION | PM | 108 | 143 |
| -469 | L 555 | -452 | L 572 | SOFT DECISION | PM | 144 | 179 |
| -450 | L 574 | -433 | L 591 | SOFT DECISION | PM | 180 | 215 |
| -431 | L 593 | -414 | L 610 | SOFT DECISION | PM | 216 | 251 |
| -412 | L 612 | -395 | L 629 | SOFT DECISION | PM | 252 | 287 |
| -393 | L 631 | -376 | L 648 | SOFT DECISION | PM | 288 | 323 |
| -374 | L 650 | -357 | L 667 | SOFT DECISION | PM | 324 | 359 |
| -355 | L 669 | -338 | L 686 | SOFT DECISION | PM | 360 | 395 |
| -336 | L 688 | -319 | L 705 | SOFT DECISION | PM | 396 | 431 |
| -317 | L 707 | -300 | L 724 | SOFT DECISION | PM | 432 | 467 |
| -298 | L 726 | -281 | L 743 | SOFT DECISION | PM | 468 | 503 |
| ~~433~~ | ~~0 433~~ | ~~450~~ | ~~0 450~~ | ERASURE | PM | 504 | 539 |
| ~~452~~ | ~~0 452~~ | ~~469~~ | ~~0 469~~ | ERASURE | PM | 540 | 575 |
| ~~471~~ | ~~0 471~~ | ~~488~~ | ~~0 488~~ | ERASURE | PM | 576 | 611 |
| ~~490~~ | ~~0 490~~ | ~~507~~ | ~~0 507~~ | ERASURE | PM | 612 | 647 |
| ~~509~~ | ~~0 509~~ | ~~526~~ | ~~0 526~~ | ERASURE | PM | 648 | 683 |
| ~~528~~ | ~~0 528~~ | ~~545~~ | ~~0 545~~ | ERASURE | PM | 684 | 719 |

*Fig. 15*

| MP3 (PML) ORIGINAL MAPPING | | | | | MP19 (P40) TARGET MAPPING | |
|---|---|---|---|---|---|---|
| STARTING SUBCARRIER NUMBER | ENDING SUBCARRIER NUMBER | PM INTERLEAVER PARTITION | INTERLEAVER MATRIX STARTING COLUMN NUMBER | INTERLEAVER MATRIX ENDING COLUMN NUMBER | STARTING SUBCARRIER NUMBER | ENDING SUBCARRIER NUMBER |
| -381 | -376 | 8 | 312 | 332 | 293 | 298 |
| -374 | -357 | 9 | 324 | 359 | 300 | 317 |

Fig. 20

| MP3 (PMU) ORIGINAL MAPPING | | | | | MP19 (P4L) TARGET MAPPING | |
|---|---|---|---|---|---|---|
| STARTING SUBCARRIER NUMBER | ENDING SUBCARRIER NUMBER | PM INTERLEAVER PARTITION | INTERLEAVER MATRIX STARTING COLUMN NUMBER | INTERLEAVER MATRIX ENDING COLUMN NUMBER | STARTING SUBCARRIER NUMBER | ENDING SUBCARRIER NUMBER |
| 357 | 374 | 10 | 360 | 395 | -317 | -300 |
| 376 | 381 | 11 | 396 | 407 | -298 | -293 |

| MP3 (P3L) ORIGINAL MAPPING | | | | MP19 (P4U) TARGET MAPPING | |
|---|---|---|---|---|---|
| STARTING SUBCARRIER NUMBER | ENDING SUBCARRIER NUMBER | PM INTERLEAVER PARTITION | INTERLEAVER MATRIX STARTING COLUMN NUMBER | INTERLEAVER MATRIX ENDING COLUMN NUMBER | STARTING SUBCARRIER NUMBER | ENDING SUBCARRIER NUMBER |
| −336 | −325 | 1 | 36 | 59 | 281 | 292 |

Fig. 23

| MP3 (P3U) ORIGINAL MAPPING | | | | MP19 (P4L) TARGET MAPPING | |
|---|---|---|---|---|---|
| STARTING SUBCARRIER NUMBER | ENDING SUBCARRIER NUMBER | PM INTERLEAVER PARTITION | INTERLEAVER MATRIX STARTING COLUMN NUMBER | INTERLEAVER MATRIX ENDING COLUMN NUMBER | STARTING SUBCARRIER NUMBER | ENDING SUBCARRIER NUMBER |
| 325 | 336 | 2 | 84 | 107 | −292 | −281 |

| STARTING | | | ENDING | | | DATA TYPE | DEINT. MATRIX | DEINTERLEAVER MATRIX STARTING COLUMN NUMBER | DEINTERLEAVER MATRIX ENDING COLUMN NUMBER |
|---|---|---|---|---|---|---|---|---|---|
| SUBCARRIER NUMBER | FFT BIN NUMBER | | SUBCARRIER NUMBER | FFT BIN NUMBER | | | | | |
| ~~545~~ | ~~L 479~~ | | ~~528~~ | ~~L 496~~ | | ERASURE | PM | 0 | 35 |
| ~~526~~ | ~~L 498~~ | | ~~509~~ | ~~L 515~~ | | ERASURE | PM | 36 | 71 |
| ~~507~~ | ~~L 517~~ | | ~~490~~ | ~~L 534~~ | | ERASURE | PM | 72 | 107 |
| ~~488~~ | ~~L 536~~ | | ~~471~~ | ~~L 553~~ | | ERASURE | PM | 108 | 143 |
| ~~469~~ | ~~L 555~~ | | ~~452~~ | ~~L 572~~ | | ERASURE | PM | 144 | 179 |
| ~~450~~ | ~~L 574~~ | | ~~433~~ | ~~L 591~~ | | ERASURE | PM | 180 | 215 |
| ~~431~~ | ~~L 593~~ | | ~~414~~ | ~~L 610~~ | | ERASURE | PM | 216 | 251 |
| ~~412~~ | ~~L 612~~ | | ~~395~~ | ~~L 629~~ | | ERASURE | PM | 252 | 287 |
| ~~393~~ | ~~L 631~~ | | ~~392~~ | ~~L 642~~ | | ERASURE | PM | 288 | 311 |
| 293 | U 281 | | 298 | U 298 | | SOFT DECISION | PM | 312 | 323 |
| 300 | U 300 | | 317 | U 317 | | SOFT DECISION | PM | 324 | 359 |
| 357 | U 357 | | 374 | U 374 | | SOFT DECISION | PM | 360 | 395 |
| 376 | U 376 | | 393 | U 393 | | SOFT DECISION | PM | 396 | 431 |
| 395 | U 395 | | 412 | U 412 | | SOFT DECISION | PM | 432 | 467 |
| 414 | U 414 | | 431 | U 431 | | SOFT DECISION | PM | 468 | 503 |
| 433 | U 433 | | 450 | U 450 | | SOFT DECISION | PM | 504 | 539 |
| 452 | U 452 | | 469 | U 469 | | SOFT DECISION | PM | 540 | 575 |
| 471 | U 471 | | 488 | U 488 | | SOFT DECISION | PM | 576 | 611 |
| 490 | U 490 | | 507 | U 507 | | SOFT DECISION | PM | 612 | 647 |
| 509 | U 509 | | 526 | U 526 | | SOFT DECISION | PM | 648 | 683 |
| 528 | U 528 | | 545 | U 545 | | SOFT DECISION | PM | 684 | 719 |

Fig. 24

| STARTING | | ENDING | | DATA TYPE | DEINT. MATRIX | DEINTERLEAVER MATRIX STARTING COLUMN NUMBER | DEINTERLEAVER MATRIX ENDING COLUMN NUMBER |
|---|---|---|---|---|---|---|---|
| SUBCARRIER NUMBER | FFT BIN NUMBER | SUBCARRIER NUMBER | FFT BIN NUMBER | | | | |
| ~~265~~ | ~~L 669~~ | ~~272~~ | ~~L 686~~ | ERASURE | PX1 | 0 | 35 |
| 281 | U 281 | 292 | U 292 | SOFT DECISION | PX1 | 36 | 59 |
| ~~324~~ | ~~L 700~~ | ~~319~~ | ~~L 719~~ | ERASURE | PX1 | 60 | 71 |
| 319 | U 319 | 336 | U 336 | SOFT DECISION | PX1 | 72 | 107 |
| 338 | U 338 | 355 | U 355 | SOFT DECISION | PX1 | 108 | 143 |

*Fig. 25*

| STARTING | | | ENDING | | DATA TYPE | DEINT. MATRIX | DEINTERLEAVER MATRIX STARTING COLUMN NUMBER | DEINTERLEAVER MATRIX ENDING COLUMN NUMBER |
|---|---|---|---|---|---|---|---|---|
| SUBCARRIER NUMBER | FFT BIN NUMBER | | SUBCARRIER NUMBER | FFT BIN NUMBER | | | | |
| -545 | L 479 | | -528 | L 496 | SOFT DECISION | PM | 0 | 35 |
| -526 | L 498 | | -509 | L 515 | SOFT DECISION | PM | 36 | 71 |
| -507 | L 517 | | -490 | L 534 | SOFT DECISION | PM | 72 | 107 |
| -488 | L 536 | | -471 | L 553 | SOFT DECISION | PM | 108 | 143 |
| -469 | L 555 | | -452 | L 572 | SOFT DECISION | PM | 144 | 179 |
| -450 | L 574 | | -433 | L 591 | SOFT DECISION | PM | 180 | 215 |
| -431 | L 593 | | -414 | L 610 | SOFT DECISION | PM | 216 | 251 |
| -412 | L 612 | | -395 | L 629 | SOFT DECISION | PM | 252 | 287 |
| -393 | L 631 | | -376 | L 648 | SOFT DECISION | PM | 288 | 323 |
| -374 | L 650 | | -357 | L 667 | SOFT DECISION | PM | 324 | 359 |
| -317 | L 707 | | -293 | L 724 | SOFT DECISION | PM | 360 | 395 |
| -298 | L 726 | | -281 | L 7313 | SOFT DECISION | PM | 396 | 407 |
| ~~382~~ | ~~L 382~~ | | ~~393~~ | ~~L 393~~ | ERASURE | PM | 408 | 431 |
| ~~395~~ | ~~L 395~~ | | ~~412~~ | ~~L 412~~ | ERASURE | PM | 432 | 467 |
| ~~414~~ | ~~L 414~~ | | ~~431~~ | ~~L 431~~ | ERASURE | PM | 468 | 503 |
| ~~433~~ | ~~L 433~~ | | ~~450~~ | ~~L 450~~ | ERASURE | PM | 504 | 539 |
| ~~452~~ | ~~L 452~~ | | ~~469~~ | ~~L 469~~ | ERASURE | PM | 540 | 575 |
| ~~471~~ | ~~L 471~~ | | ~~488~~ | ~~L 488~~ | ERASURE | PM | 576 | 611 |
| ~~490~~ | ~~L 490~~ | | ~~507~~ | ~~L 507~~ | ERASURE | PM | 612 | 647 |
| ~~509~~ | ~~L 509~~ | | ~~526~~ | ~~L 526~~ | ERASURE | PM | 648 | 683 |
| ~~528~~ | ~~L 528~~ | | ~~545~~ | ~~L 545~~ | ERASURE | PM | 684 | 719 |

Fig. 26

| STARTING | | ENDING | | DATA TYPE | DEINT. MATRIX | DEINTERLEAVER MATRIX STARTING COLUMN NUMBER | DEINTERLEAVER MATRIX ENDING COLUMN NUMBER |
|---|---|---|---|---|---|---|---|
| SUBCARRIER NUMBER | FFT BIN NUMBER | SUBCARRIER NUMBER | FFT BIN NUMBER | | | | |
| −355 | L 669 | −338 | L 686 | SOFT DECISION | PX1 | 0 | 35 |
| −336 | L 688 | −319 | L 705 | SOFT DECISION | PX1 | 36 | 71 |
| ~~−319~~ | ~~U 319~~ | ~~−324~~ | ~~U 324~~ | ERASURE | PX1 | 72 | 83 |
| −292 | L 732 | −281 | L 743 | SOFT DECISION | PX1 | 84 | 107 |
| ~~−338~~ | ~~U 338~~ | ~~−355~~ | ~~U 355~~ | ERASURE | PX1 | 108 | 143 |

Fig. 27 ured for legacy service mode MP1, in
FM SYSTEM MODES FOR HD RADIO

CROSS-REFERENCE TO RELATED APPLICATION

This application claims the benefit of U.S. Provisional Application No. 62/631,745, filed Feb. 17, 2018, which is hereby incorporated by reference in its entirety.

FIELD OF THE DISCLOSURE

The technology described in this document relates generally to devices and methods for transmitting and processing frequency modulation (FM) radio signals, and more particularly to devices and methods for defining service modes for transmitting digital data in FM radio signals.

BACKGROUND OF THE DISCLOSURE

Historically, when television and radio broadcast systems have evolved to incorporate additional features, there was considerable effort to ensure backward compatibility for the additional features. Historically, the additional features were added in a manner such that the protocols of legacy television or radio receivers still functioned.

For example, when television broadcasters added color to their broadcasts, the color was added in a manner that would produce suitable black-and-white images on legacy black-and-white televisions that could not decode color. As another example, when digital services were added to analog frequency modulation (FM) radio systems, the digital services were added in a manner that would be invisible to the analog receivers.

BRIEF DESCRIPTION OF THE DRAWINGS

FIG. 12 shows an example of P1 subcarrier re-mapping of the M12 upper band, in accordance with some embodiments.

FIG. 13 shows an example of P1 subcarrier re-mapping of the M12 lower band, in accordance with some embodiments.

FIG. 14 shows an example of P1 soft decision mapping for service mode M12 upper band, in accordance with some embodiments.

FIG. 15 shows an example of P1 soft decision mapping for service mode M12 lower band, in accordance with some embodiments.

FIG. 20 shows an example of P1 subcarrier re-mapping of the M19 upper band, in accordance with some embodiments.

FIG. 21 shows an example of P1 subcarrier re-mapping of the M19 lower band, in accordance with some embodiments.

FIG. 22 shows an example of P3 subcarrier re-mapping of the M19 upper band, in accordance with some embodiments.

FIG. 23 shows an example of P3 subcarrier re-mapping of the M19 lower band, in accordance with some embodiments.

FIG. 24 shows an example of P1 soft decision mapping for service mode M19 upper band, in accordance with some embodiments.

FIG. 25 shows an example of P3 soft decision mapping for service mode M19 upper band, in accordance with some embodiments.

FIG. 26 shows an example of P1 soft decision mapping for service mode M19 lower band, in accordance with some embodiments.

FIG. 27 shows an example of P3 soft decision mapping for service mode M19 lower band, in accordance with some embodiments.

Corresponding reference characters indicate corresponding parts throughout the several views. Elements in the drawings are not necessarily drawn to scale. The configurations shown in the drawings are merely examples, and should not be construed as limiting the scope of the invention in any manner.

DETAILED DESCRIPTION

Figure 1:
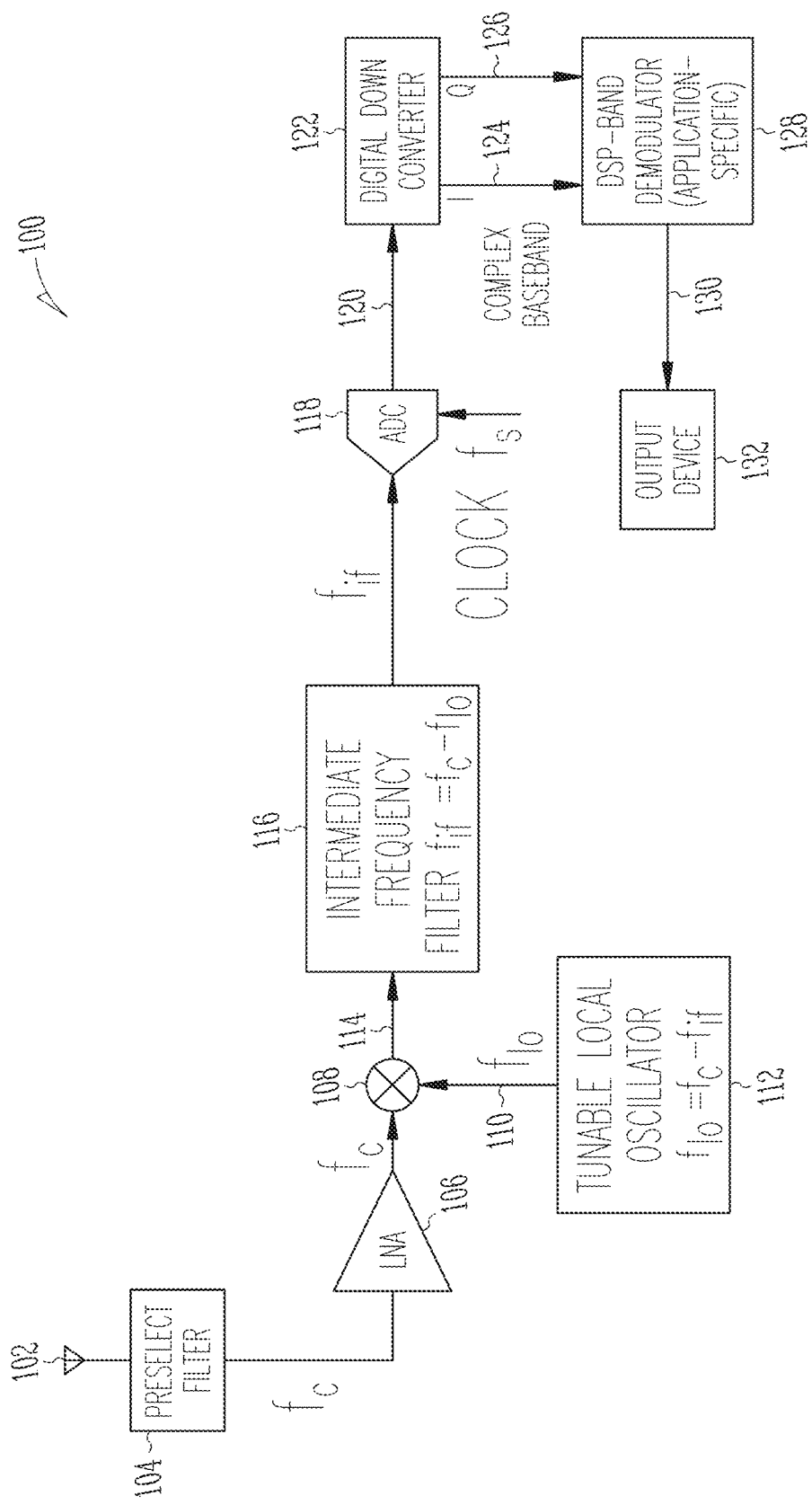
FIG. 1 is a block diagram of portions of an example of a receiver that can process in-band on-channel (IBOC) radio signals, in accordance with some embodiments.

Service modes specify how digital content is formatted in sidebands of an FM radio channel. In an improved service mode, such as the M12 or M19 service modes discussed in detail below, encoded bits can be distributed between an in-band encoded component and a cross-band encoded component, where the encoded bits in the in-band encoded component are desynchronized by a specified duration with respect to the encoded bits in the cross-band encoded component. The encoded bits in the in-band encoded component can be allocated into frequency partitions that are used by a legacy service mode, such as the MP1 or MP3 service modes, which can provide backward compatibility with the legacy service mode. The encoded bits in the cross-band encoded component can be allocated into frequency partitions that are not used by the legacy service mode, and are found in the opposite sideband, compared with the legacy service mode, which can provide time diversity within a single sideband.

The preceding paragraph is merely a summary of subject matter that follows in the Detailed Description, and should not be construed as limiting in any way.

When digital services were added to analog frequency modulation (FM) radio systems, the digital services were added in a manner that would be invisible to the analog receivers. For example, the digital services were provided in new sidebands (e.g. designated frequency ranges above and below a central frequency of a radio channel). The new sidebands were far enough away from the central frequency, such that the frequency-selecting filters in legacy analog receivers filtered out the new sidebands.

The new expansions to sidebands surrounded a central frequency band, which can include an analog FM signal. The analog FM signal maintained backward compatibility with the legacy analog receivers, because it used frequencies only within a specified range of frequencies around the central frequency. Further, the analog FM signal functioned as a default signal that could be easily received and interpreted by newer receivers in case the digital signal fails.

In current FM broadcast systems, such as those discussed in the published document "HD Radio™ Air Interface Design Description Layer 1 FM Rev. G", dated Aug. 23, 2011 (where HD Radio™ is a proprietary trademark of iBiquity Digital Corporation), digital content is delivered in a lower sideband (extending over a range of frequencies that are less than the central frequency) and an upper sideband (extending over a range of frequencies that are greater than the central frequency).

In the current systems, the lower and upper sidebands include the same content, but with a fixed delay (e.g., a specified temporal offset) between data streams in the lower and upper sidebands. For example, the data in the lower sideband can be delayed by 1.4 seconds with respect to the data in the upper sideband. As another example, the data in the upper sideband can be delayed by 0.7 seconds with respect to the data in the lower sideband. These are but mere numerical examples; other suitable delays can also be used.

Such a fixed delay provides what is known as time diversity. Time diversity can overcome short bursts of adverse channel conditions, and can avoid service outages in a broadcast transmission system. For example, if data from one of the sidebands is momentarily blocked, such as by fading or impulsive noise, data from the other sideband (at a delayed time) can be used to replace the blocked data. Time diversity can improve the robustness of the content delivered in the lower and upper sidebands.

There are several legacy service modes of operation for FM broadcast systems. Two such service modes are discussed presently.

In a first legacy service mode, referred to as "MP1", an analog FM signal is present in a central frequency band that extends from −100 kHz to +100 kHz from a center frequency of the radio channel. A lower digital sideband (referred to as a primary main lower sideband, or PML) extends from −200 kHz away from the center frequency to −130 kHz away from the center frequency. An upper digital sideband (referred to as a primary main upper sideband, or PMU) extends from +130 kHz away from the center frequency to +200 kHz away from the center frequency. The lower and upper digital sidebands each include a data stream having a data rate of 96 kbps and a code rate of ⅘. (Note that code rate can define the increase in overhead on a coded channel resulting from channel encoding. Code rate is defined as the ratio of information bits to the total number of bits after encoding. For the data streams in the legacy MP1 service mode, the PML and PMU sidebands carry about 120 kbps of cooperative punctured polar coding (CPPC) encoded bits, with a code rate of ⅘, allowing for an effective data rate of 96 kbps.) The digital information in the lower and upper digital sidebands is included in carriers that are equally spaced in frequency within the sidebands, and have the same digital signal level as one another. The data streams in the lower and upper digital sidebands are temporally offset from one another, to provide time diversity.

In some examples, the upper sideband of the MP1 service mode includes ten partitions, each with a width of 6,904 Hz (or, about 7 kHz), that collectively extend over the range of 129,361 Hz (or, about 130 kHz) above the center frequency to 198,402 Hz (or, about 200 kHz) above the center frequency. Similarly, in some examples, the lower sideband of the MP1 service mode includes ten partitions, each with a width of 6,904 Hz (or, about 7 kHz), that collectively extend over the range of 198,402 Hz (or, about 200 kHz) below the center frequency to 129,361 Hz (or, about 130 kHz) below the center frequency.

In a second legacy service mode, referred to as "MP3", an analog FM signal is present in a central frequency band that extends from −100 kHz to +100 kHz from a center frequency of the radio channel, which is the same as for MP1. A lower digital sideband extends from −200 kHz away from the center frequency to −115 kHz away from the center frequency. The lower digital sideband extends over an outer frequency range, from −200 kHz away from the center frequency to −130 kHz away from the center frequency (referred to as a primary main lower sideband, or PML), and an inner frequency range, from −130 kHz away from the center frequency to −115 kHz away from the center frequency (referred to as P3L). Similarly, the upper digital sideband extends over an inner frequency range, from +115 kHz away from the center frequency to +130 kHz away from the center frequency (referred to as P3U), and an outer frequency range, from +130 kHz away from the center frequency to +200 kHz away from the center frequency (referred to as a primary main upper sideband, or PMU). In the lower and upper digital sidebands of the MP3 service mode, the outer frequency range (corresponding to PML and PMU) is configured to maintain compatibility with the MP1 service mode, with a data stream having a data rate of 96 kbps and a code rate of ⅘, while the inner frequency range (corresponding to P3L and P3U) is configured to provide additional data that raises the effective bit rate of the sidebands from 96 kbps in MP1 to 120 kbps in MP3. The additional data in the inner frequency range (P3L and P3U) is provided at a data rate of 24 kbps and a code rate of 1. (Note that the additional data in P3L and P3U can be considered to be less essential than the data in PML and PMU. If the data in P3L and P3U is momentarily obscured, the effect will be a momentary drop in sound quality as the data rate momentarily drops 120 kbps to 96 kbps.) As with the MP1 service mode, the data streams in the lower and upper digital sidebands of the MP3 service mode are also temporally offset from one another, to provide time diversity.

In some examples, the upper sideband of the MP3 service mode includes twelve partitions, each with a width of 6,904 Hz (or, about 7 kHz), that collectively extend over the range of 115,553 Hz (or, about 115 kHz) above the center frequency to 198,402 Hz (or, about 200 kHz) above the center frequency. Similarly, in some examples, the lower sideband of the MP3 service mode includes twelve partitions, each with a width of 6,904 Hz (or, about 7 kHz), that collectively extend over the range of 198,402 Hz (or, about 200 kHz)

below the center frequency to 115,553 Hz (or, about 115 kHz) below the center frequency.

Importantly, in both the legacy MP1 and MP3 service modes, the lower and upper sidebands are complementary. Specifically, the lower sideband provides the same content, service, and/or program material as the upper sideband. Several improved service modes are discussed in detail below, in which the lower and upper sidebands can optionally include different content, service, and/or program material from one another. The improved service modes can be backward compatible with legacy service modes MP1 and/or MP3.

In some examples, a radio transmitter can include transmitting circuitry configured to broadcast over a frequency modulation (FM) radio channel. The FM radio channel can have a center frequency and a sideband. The FM radio channel can include digital data in a plurality of partitions. Each partition can be broadcast at a specified frequency within the sideband. The radio transmitter can further include processing circuitry. The processing circuitry can receive input bits for transmitting. The processing circuitry can encode the input bits using forward error correction encoding to form encoded bits. The processing circuitry can distribute the encoded bits between an in-band encoded component and a cross-band encoded component. The encoded bits in the in-band encoded component can be desynchronized by a specified duration with respect to the encoded bits in the cross-band encoded component. The processing circuitry can allocate the encoded bits of the in-band encoded component into a first group of partitions of the sideband. The first group can correspond to partitions in a sideband of a legacy service mode, such as MP1 or MP3. The processing circuitry can allocate the encoded bits of the cross-band encoded component into a second group of partitions of the sideband. The second group can correspond to partitions that are absent from the legacy service mode. The processing circuitry can modulate the encoded bits for transmitting. The processing circuitry can direct the modulated encoded bits to the transmitting circuitry for broadcasting in the sideband of the FM radio channel.

An important distinction over legacy service modes is the availability of time diversity from a single sideband.

In legacy service modes, such as MP1 or MP3, data in the partitions of the lower sideband are all synchronized to one another, data in the partitions of the upper sideband are all synchronized to one another, and the lower sideband is desynchronized with respect to the upper sideband. In order to achieve time diversity, legacy receivers would have to receive data from both sidebands.

In the improved service modes, such as the M12 and M19 modes discussed in detail below, data in at least one partition of a sideband is desynchronized with respect to data in at least one other partition in the same sideband. In order to achieve time diversity, improved receivers can achieve time diversity from just the single sideband, rather than requiring data from both sidebands. As a result, the improved service modes can improve coverage (e.g., improve robustness of the signal), improve the bitrate of signal (thereby improving sound quality), and/or, provide additional services or content. In some examples, the opposite sideband can be used to provide additional robustness, additional bitrate, and/or additional services or content.

The following discussion includes sections that describe suitable hardware for transmitting and receiving over the FM channel (applicable to all service modes), a section that describes the legacy MP1 and MP3 service modes, a section that describes the improved M12 and M19 service modes, a glossary, and a section of specific examples.

Hardware

FIG. 1 is a block diagram of portions of an example of a receiver 100 that can process in-band on-channel (IBOC) radio signals, in accordance with some embodiments. In the example, an IBOC radio signal is received on antenna 102. A bandpass preselect filter 104 passes the frequency band of interest, including the desired signal at frequency $f_c$, but rejects the image signal at ($f_c - 2f_{if}$) (for a low sideband injection local oscillator). Low noise amplifier 106 amplifies the signal. The amplified signal is mixed in mixer 108 with a local oscillator signal $f_{lo}$ supplied on line 110 by a tunable local oscillator 112. This creates sum ($f_c + f_{lo}$) and difference ($f_c - f_{lo}$) signals on line 114. Intermediate frequency filter 116 passes the intermediate frequency (IF) signal $f_{if}$ and attenuates frequencies outside of the bandwidth of the modulated signal of interest. An analog-to-digital converter 118 operates using a clock signal $f_s$ to produce digital samples on line 120 at a rate $f_s$. Digital down converter 122 frequency shifts, filters and decimates the signal to produce lower sample rate in-phase and quadrature signals on lines 124 and 126. Processing circuitry, such as digital signal processor 128 or other type of processor, then provides additional signal processing to produce an output signal on line 130 for output device 132.

Figure 2:
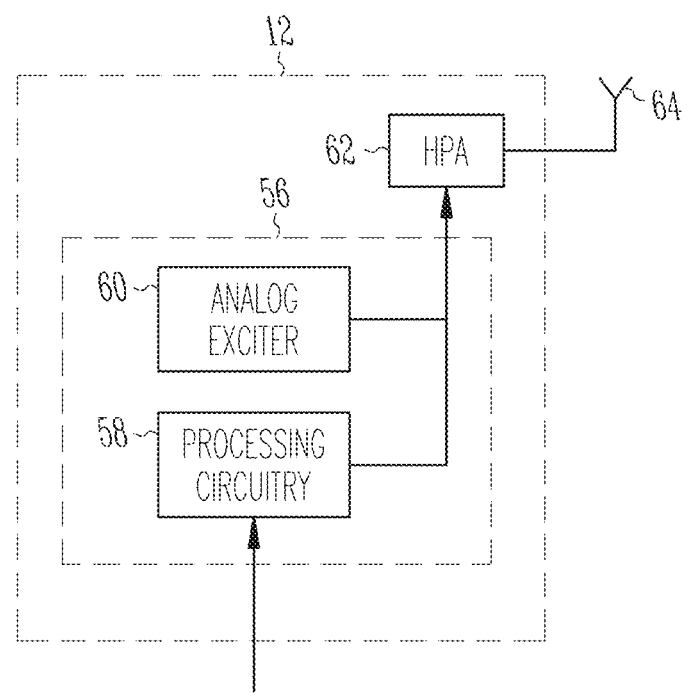
FIG. 2 is a functional block diagram of a radio transmitter that can be used to broadcast an FM IBOC radio signal, in accordance with some embodiments.

FIG. 2 is a functional block diagram of a radio transmitter 12 that can be used to broadcast an FM IBOC radio signal, in accordance with some embodiments. The radio transmitter can include an exciter 56 and an analog exciter 60. Data for broadcasting is passed to the exciter 56, which produces the FM IBOC waveform. The exciter includes processing circuitry 58, digital up-converter (not shown), and at least one RF up-converter (not shown). The exciter accepts exciter link data and modulates the digital portion of the IBOC radio waveform. The RF up-converter of the exciter up-converts the analog signal to the proper in-band channel frequency. The up-converted signal is then passed to the high-power amplifier 62 and antenna 64 for broadcast. In some examples, the exciter adds MPS audio to a digital waveform and the radio transmitter does not include the analog exciter 60.

Figure 3A:
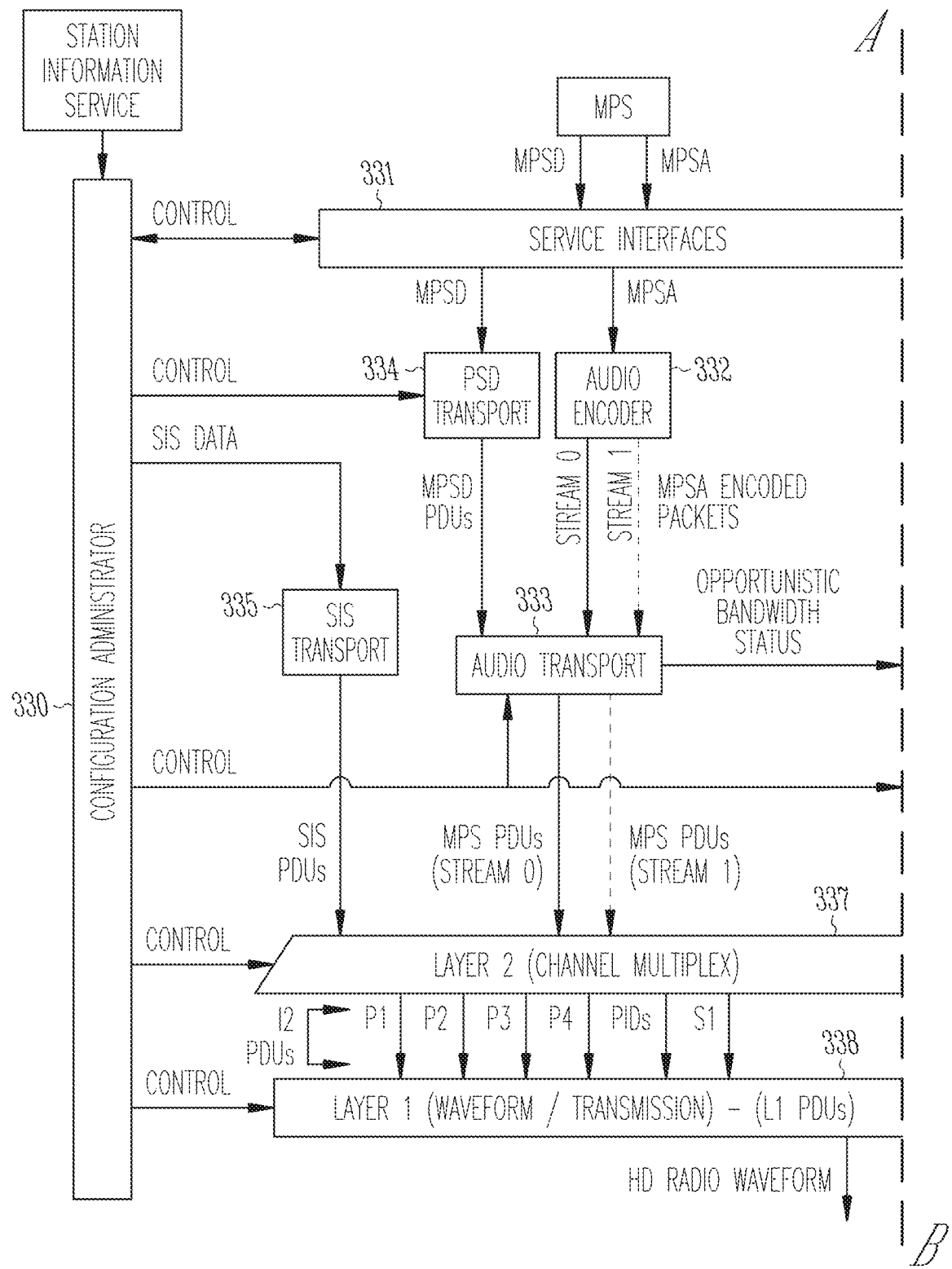
FIGS. 3A and 3B show an IBOC logical protocol stack from the transmitter perspective, in accordance with some embodiments.
Figure 3B:
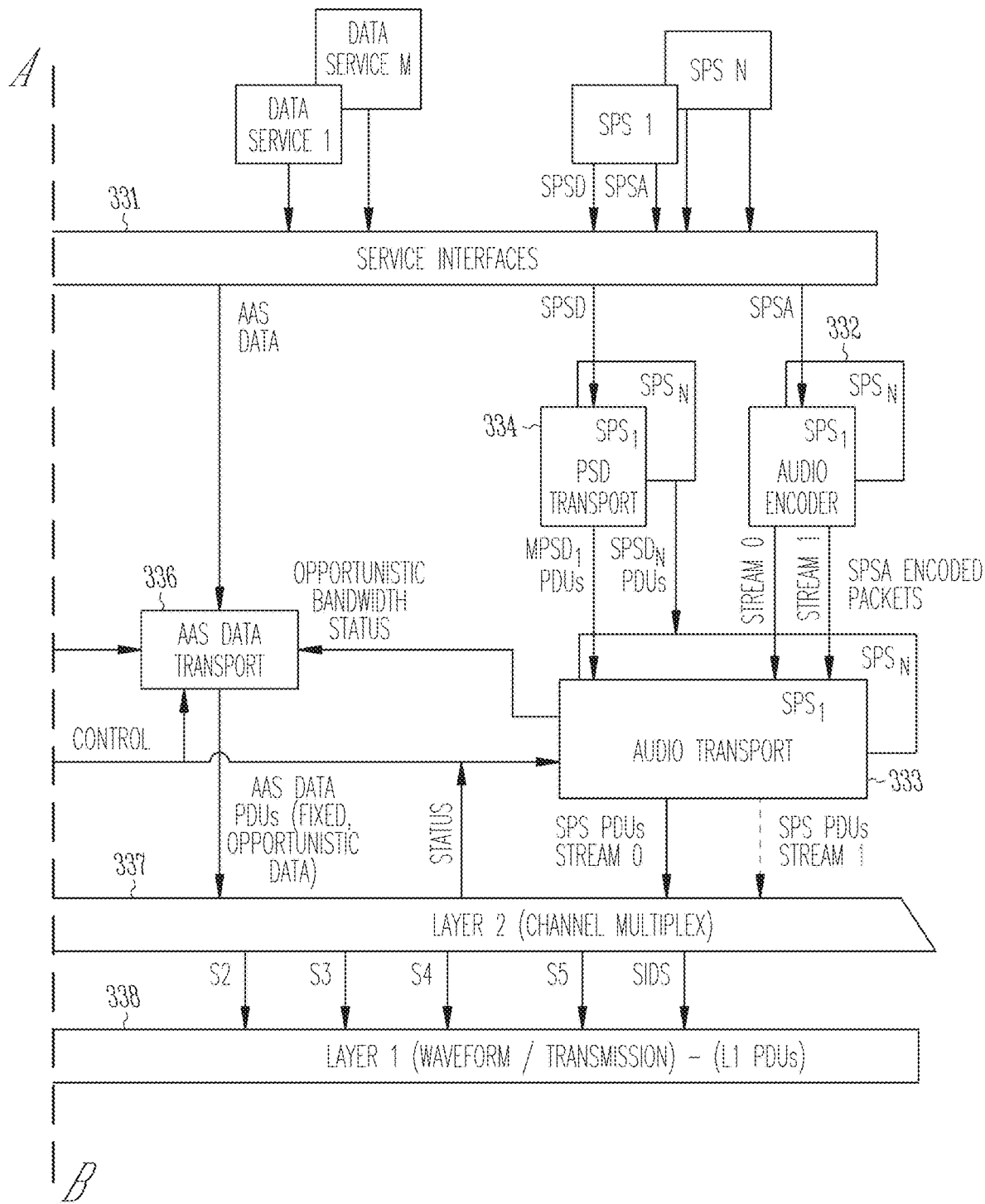

FIGS. 3A and 3B show an IBOC logical protocol stack from the transmitter perspective, in accordance with some embodiments. The logical protocol stack can be implemented using the processing circuitry 58 of the radio transmitter in FIG. 2 that can include one or more processors. From the receiver perspective, the protocol stack is traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given protocol layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 3A and 3B, there is a configuration administrator 330, which is a system function that supplies configuration and control information to the various entities within the protocol stack. The configuration/control information can include user-defined settings, as well as information generated from within the system such as GPS time and position. The service interfaces 331 represent the interfaces for all services except station information services (SIS). The service interface may be different for each of the various types of services. For example, for main program service (MPS) audio and supplemental program service (SPS) audio, the service interface may be an audio card. For MPS data and SPS data, the interfaces may be in the form of different application program interfaces (APIs). For all other data services, the interface is in the form of a single API.

An audio codec 332 encodes both MPS audio and SPS audio to produce a core stream (Stream 0) and optional enhancement stream (Stream 1) of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data.

The SIS transport 335 receives SIS data from the configuration administrator and generates SIS PDUs. A SIS PDU can contain station identification and location information, program type, as well as absolute time and position correlated to GPS. The Advanced Application Service (AAS) data transport 336 receives AAS data from the service interface, as well as opportunistic bandwidth data from the audio transport, and generates AAS data PDUs, which can be based on quality of service parameters.

The transport and encoding functions are collectively referred to as Layer 4 of the protocol stack, and the corresponding transport PDUs are referred to as Layer 4 PDUs (or L4 PDUs). Layer 2 (L2), which is the channel multiplex layer 337, receives transport PDUs from the SIS transport, AAS data transport, and audio transport, and formats them into Layer 2 PDUs. An L2 PDU may include protocol control information, Reed Solomon parity bytes, and a payload, which can be audio, data, or a combination of audio and data. L2 PDUs are routed through the correct logical channels to Layer 1 (L1) or the physical layer. A logical channel is a signal path that conducts the L2 PDUs through Layer 1 338 with a specified grade of service determined by a service mode of the IBOC radio signal. The service mode is a specific configuration of operating parameters specifying throughput, performance level, and selected logical channels.

There can be multiple logical channels passed between Layer 2 and Layer 1, and the specific logical channels and their grade of service is determined by the service mode. The number of active physical-layer logical channels and the characteristics defining them vary among the different service modes. Status information is also passed between Layer 2 and the physical layer. Layer 1 converts the PDUs from Layer 2 and system control information into an FM IBOC radio signal for transmission. Layer 2 and Layer 1 processing can include scrambling, channel encoding, interleaving, OFDM subcarrier mapping, and OFDM signal generation. The output of OFDM signal generation is a complex, baseband, time-domain pulse representing the digital portion of an IBOC signal for a particular symbol. Discrete symbols are concatenated to form a continuous time domain waveform, which is modulated to create an IBOC signal waveform for transmission.

As with most data transfer systems, improved robustness and capacity of the data is desired. In some cases, it is desirable that any improvements be backward compatible with legacy service modes. New non-backward compatible (NBC) service modes may also be desirable for even higher capacity in new geographical regions or for new radio signal applications, such as for control of autonomous vehicles, configuration of connected cars, broadcast of global positioning system (GPS) correction data for centimeter-scale positioning, etc. Improved service modes can help meet the demands for increased capacity and robustness. Legacy service modes, such as MP1 and MP3, and improved service modes, such as M12 and M19, are discussed below in detail.

Overview

Layer 1 of the FM system converts information from Layer 2 (L2) and system control from the Configuration Administrator into the FM HD Radio waveform for transmission in the VHF band. Information and control are transported in discrete transfer frames via multiple logical channels. These transfer frames are also referred to as Layer 2 Protocol Data Units (PDUs).

The L2 PDUs vary in size and format depending on the service mode. The service mode, a major component of system control, determines the transmission characteristics of each logical channel. After assessing the requirements of candidate applications, higher protocol layers select service modes that most suitably configure the logical channels. The plurality of logical channels reflects the inherent flexibility of the system, which supports simultaneous delivery of various combinations of digital audio and data.

Layer 1 also receives system control from the Configuration Administrator for use by the Layer 1 System Control Processor.

The design provides a flexible means of transitioning to a digital broadcast system by providing three new waveform types: Hybrid, Extended Hybrid, and All Digital. The Hybrid and Extended Hybrid types retain the analog FM signal, while the All Digital type does not. All three waveform types conform to the current spectral emissions mask.

The digital signal is modulated using Orthogonal Frequency Division Multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

The digital signal is transmitted in Primary Main (PM) sidebands on both sides of the analog FM signal in the Hybrid waveform. The power level of each sideband is appreciably below the total power in the analog FM signal. The analog signal may be monophonic or stereo, and may include Subsidiary Communications Authorization (SCA) channels.

In the Extended Hybrid waveform, the bandwidth of the Hybrid sidebands can be extended toward the analog FM signal to increase digital capacity. This additional spectrum, allocated to the inner edge of each Primary Main sideband, is termed the Primary Extended (PX) sideband.

In the All Digital waveform, the analog signal is removed and the bandwidth of the primary digital sidebands is fully extended as in the Extended Hybrid waveform. In addition, this waveform allows lower-power digital secondary sidebands to be transmitted in the spectrum vacated by the analog FM signal.

The System Control Channel (SCCH) transports control and status information. Primary and secondary service mode control and amplitude scale factor select are sent from the Configuration Administrator to Layer 1, while synchronization information is sent from Layer 1 to Layer 2. In addition, several bits of the system control data sequence designated "reserved" are controlled from layers above L1 via the primary reserved control data interface and the secondary reserved control data interface.

A logical channel is a signal path that conducts L2 PDUs in transfer frames into Layer 1 with a specific grade of service, determined by service mode. Layer 1 of the FM air interface provides 11 logical channels to higher layer protocols. Not all logical channels are used in every service mode.

There are five primary logical channels that can be used with the Hybrid, Extended Hybrid, and All Digital waveforms. They are denoted as P1, P2, P3, P4, and PIDS. The PIDS channel transmits the Station Information Service (SIS) information.

Logical channels P1 through P4 and S1 through S5 are designed to convey audio and data, while the Primary IBOC Data Service (PIDS) and Secondary IBOC Data Service (SIDS) logical channels are designed to carry Station Information Service (SIS) information.

The performance of each logical channel is completely described through three characterization parameters: transfer, latency, and robustness. Channel encoding, spectral mapping, interleaver depth, and digital diversity delay are the components of these characterization parameters. The service mode uniquely configures these components within Layer 1 for each active logical channel, thereby determining the appropriate characterization parameters.

In addition, the service mode specifies the framing and synchronization of the transfer frames through each active logical channel.

Each logical channel has a dedicated scrambler and channel encoder. The configuration administrator is a system function that configures each of the layers using SCCH information or parameters which do not change often. However, dynamic SCCH parameters such as the L1 Block Count and ALFN are sent from Layer 1 to Layer 2.

Scrambling randomizes the digital data in each logical channel to mitigate signal periodicities. At the output of the scrambling function, the logical channel vectors retain their identity, but are distinguished by the "S" subscript (e.g., "P1S").

Channel Encoding uses convolutional encoding to add redundancy to the digital data in each logical channel to improve its reliability in the presence of channel impairments. The size of the logical channel vectors is increased in inverse proportion to the code rate. The encoding techniques are configurable by service mode. Digital Diversity delay is also imposed on selected logical channels. In a few service modes, P1 and S1 are split to provide a delayed and undelayed version at the output.

Interleaving in time and frequency is employed to mitigate the effects of burst errors. The interleaving techniques are tailored to the VHF fading environment and are configurable by service mode. In this process, the logical channels lose their identity. The interleaver output is structured in a matrix format; each matrix consists of one or more logical channels and is associated with a particular portion of the transmitted spectrum. The interleaver matrix designations reflect the spectral mapping. For example, "PM" maps to the Primary Main portion of the spectrum, and "SX1" maps to the Secondary Extended (SX) portion of the spectrum.

System Control Processing generates a matrix of system control data sequences that include control and status (such as service mode), for broadcast on the reference subcarriers. This data matrix is designated "R" for "Reference."

OFDM Subcarrier Mapping assigns the interleaver matrices and the system control matrix to the OFDM subcarriers. One row of each active interleaver matrix is processed every OFDM symbol Ts to produce one output vector X which is a frequency-domain representation of the signal. The mapping is specifically tailored to the non-uniform interference environment and is a function of the service mode.

OFDM Signal Generation generates the digital portion of the time-domain FM HD Radio waveform. The input vectors are transformed into a shaped time-domain baseband pulse, yn(t), defining one OFDM symbol.

Transmission Subsystem formats the baseband waveform for transmission through the VHF channel. Major sub-functions include symbol concatenation and frequency up-conversion. In addition, when transmitting the Hybrid waveform, this function modulates the analog source and combines it with the digital signal to form a composite Hybrid signal, s(t), ready for transmission.

Waveforms and Spectra for Legacy Service Modes

This section describes the output spectrum for each of the three digital waveform types: Hybrid, Extended Hybrid, and All Digital. Each spectrum is divided into several sidebands which represent various subcarrier groupings. All spectra are represented at baseband.

The OFDM subcarriers are assembled into frequency partitions. Each frequency partition consists of eighteen data subcarriers (designated as d1 through d18) and one reference subcarrier. The position of the reference subcarrier (either at the beginning or the end of the frequency range of the subcarriers) varies with the location of the frequency partition within the spectrum.

For each frequency partition, data subcarriers d1 through d18 convey the payload (data or encoded audio) from Layer 2 while the reference subcarriers convey L1 system control. Subcarriers are numbered from minus 546 at the lower end to zero at the center frequency to plus 546 at the upper end of the channel frequency allocation.

Besides the reference subcarriers resident within each frequency partition, depending on the service mode, up to five additional reference subcarriers are inserted into the spectrum at the following subcarrier numbers: −546, −279, 0, +279, and +546. The overall effect is a regular distribution of reference subcarriers throughout the spectrum. For notational convenience, each reference subcarrier is assigned a unique identification number between 0 and 60.

Each spectrum described below shows the subcarrier number and center frequency of certain key OFDM subcarriers. The center frequency of a subcarrier is calculated by multiplying the subcarrier number by the OFDM subcarrier spacing. The center of subcarrier 0 is located at 0 Hz. In this context, center frequency is relative to the radio frequency (RF) allocated channel.

For example, the upper Primary Main sideband is bounded by subcarriers 356 and 546 whose center frequencies are located at 129,361 Hz and 198,402 Hz, respectively. The frequency span of a Primary Main sideband is 69,041 Hz (198,402 Hz −129,361 Hz).

Figure 4:
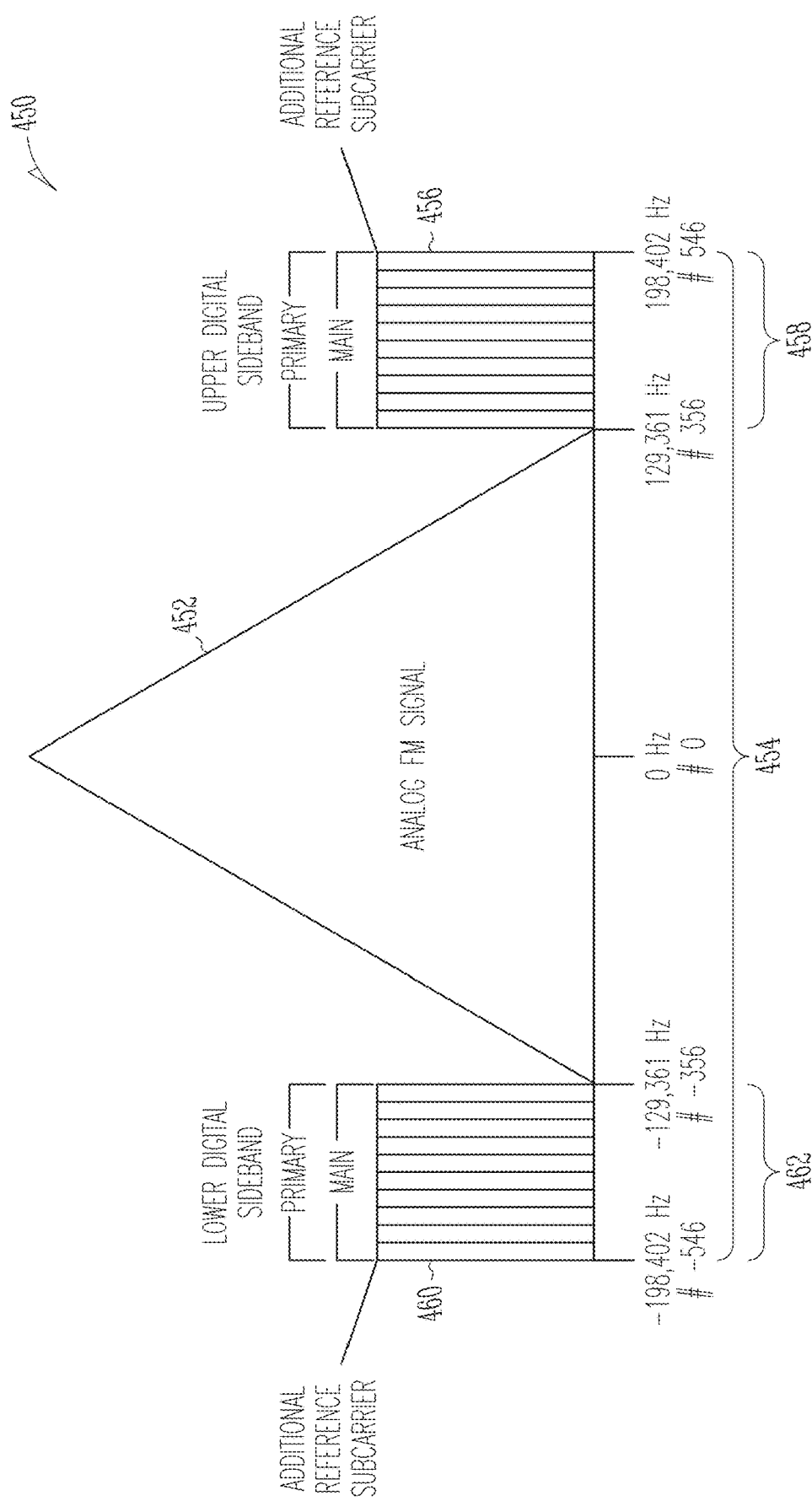
FIG. 4 is a schematic representation of a spectrum of a hybrid FM waveform for legacy service mode MP1, in accordance with some embodiments.

FIG. 4 is a schematic representation of a spectrum of a hybrid FM waveform 450 for legacy service mode MP1, in accordance with some embodiments. The waveform includes an analog modulated signal 452 located in the center of a broadcast channel 454, a first set of multiple evenly spaced OFDM subcarriers 456 in an upper sideband 458, and a second set of multiple evenly spaced OFDM subcarriers 460 in a lower sideband 462. The digitally modulated subcarriers are broadcast at a lower power level than the analog modulated carrier to comply with required channel signal masks. The digitally modulated subcarriers are arranged into frequency partitions and various subcarriers are designated as reference subcarriers. A frequency partition is a group of 19 OFDM subcarriers containing 18 data subcarriers and 1 reference subcarrier.

The subcarriers are located at evenly spaced frequency locations. The subcarrier locations are numbered from −546 to +546. In the waveform of FIG. 4, the subcarriers are at locations +356 to +546 and −356 to −546. This waveform may be used during an initial transitional phase preceding conversion to the all-digital waveform.

Each primary main sideband is comprised of ten frequency partitions, which are allocated among subcarriers 356 through 545, or −356 through −545. Subcarriers 546 and −546, also included in the primary main sidebands, are additional reference subcarriers. The amplitude of each subcarrier can be scaled by an amplitude scale factor.

Figure 5:
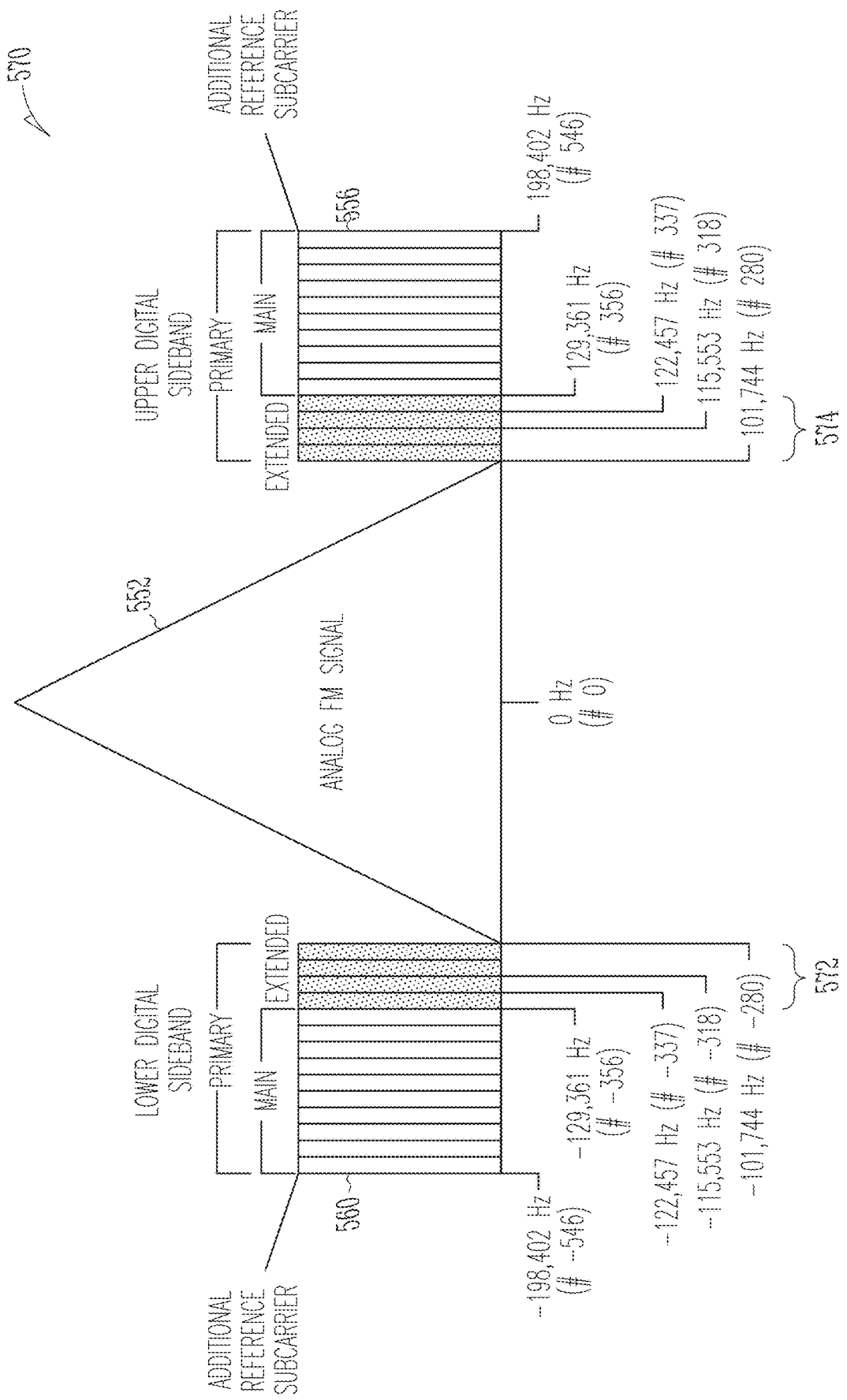
FIG. 5 is a schematic representation of a spectrum of an extended hybrid FM waveform for legacy service mode MP3, in accordance with some embodiments.

In the hybrid waveform, the digital signal is transmitted in Primary Main (PM) sidebands on either side of the analog FM signal. The power level of each digital sideband is appreciably below the total power in the analog FM signal. The analog signal may be monophonic or stereo, and may include subsidiary communications authorization (SCA) channels. In some examples, the analog FM signal can extend from −130 kHz of the center frequency to +130 kHz of the center frequency. In other examples, the analog FM signal can extend from −100 kHz of the center frequency to +100 kHz of the center frequency FIG. 5 is a schematic representation of a spectrum of an extended hybrid FM waveform 570 for legacy service mode MP3, in accordance with some embodiments. The extended hybrid waveform is created by adding primary extended sidebands 572, 574 to the primary main sidebands present in the hybrid waveform. This additional spectrum, allocated to the inner edge of each Primary Main sideband, is termed the Primary Extended (PX) sideband. Depending on the service mode, one, two, or four frequency partitions can be added to the inner edge of each primary main sideband. For MP3, the two outermost frequency partitions are added to the inner edge of each primary sidebands.

The extended hybrid waveform includes the analog FM signal 552 plus digitally modulated primary main subcarriers 556, 560 (subcarriers +356 to +546 and −356 to −546) and some or all primary extended subcarriers (subcarriers +280 to +355 and −280 to −355). This waveform can be used during an initial transitional phase preceding conversion to the all-digital waveform.

Each primary main sideband includes ten frequency partitions and an additional reference subcarrier spanning subcarriers 356 through 546, or −356 through −546. The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 6:
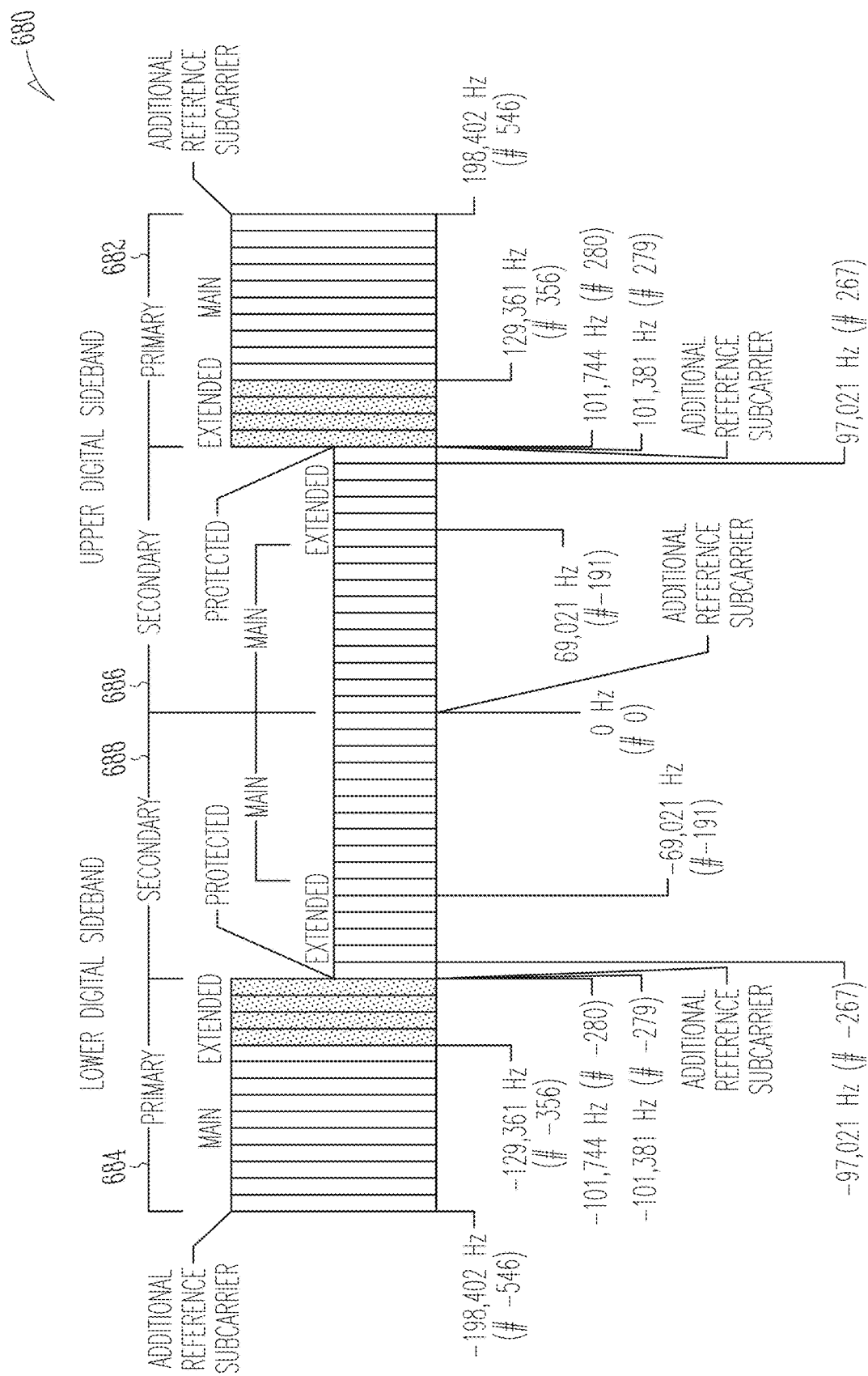
FIG. 6 is a schematic representation of the spectrum of an all-digital FM waveform, in accordance with some examples.

FIG. 6 is a schematic representation of the spectrum of an all-digital FM waveform 680, in accordance with some examples. The all-digital waveform is constructed by disabling the analog signal, fully expanding the bandwidth of the primary digital sidebands 682, 684, and adding lower-power secondary sidebands 686, 688 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has fourteen secondary broadband (SB) frequency partitions. Each secondary sideband spans subcarriers 1 through 267 or −1 through −267. Subcarriers 0, 268 through 279, and −268 through −279 are not populated. The total frequency span of the entire all-digital spectrum is 396,803 Hz. The amplitude of each subcarrier can be scaled by an amplitude scale factor. The secondary-sideband amplitude scale factors can be user-selectable.

All three waveform types (hybrid, extended hybrid, and all digital) conform to a currently allocated spectral emissions mask.

Figure 7:
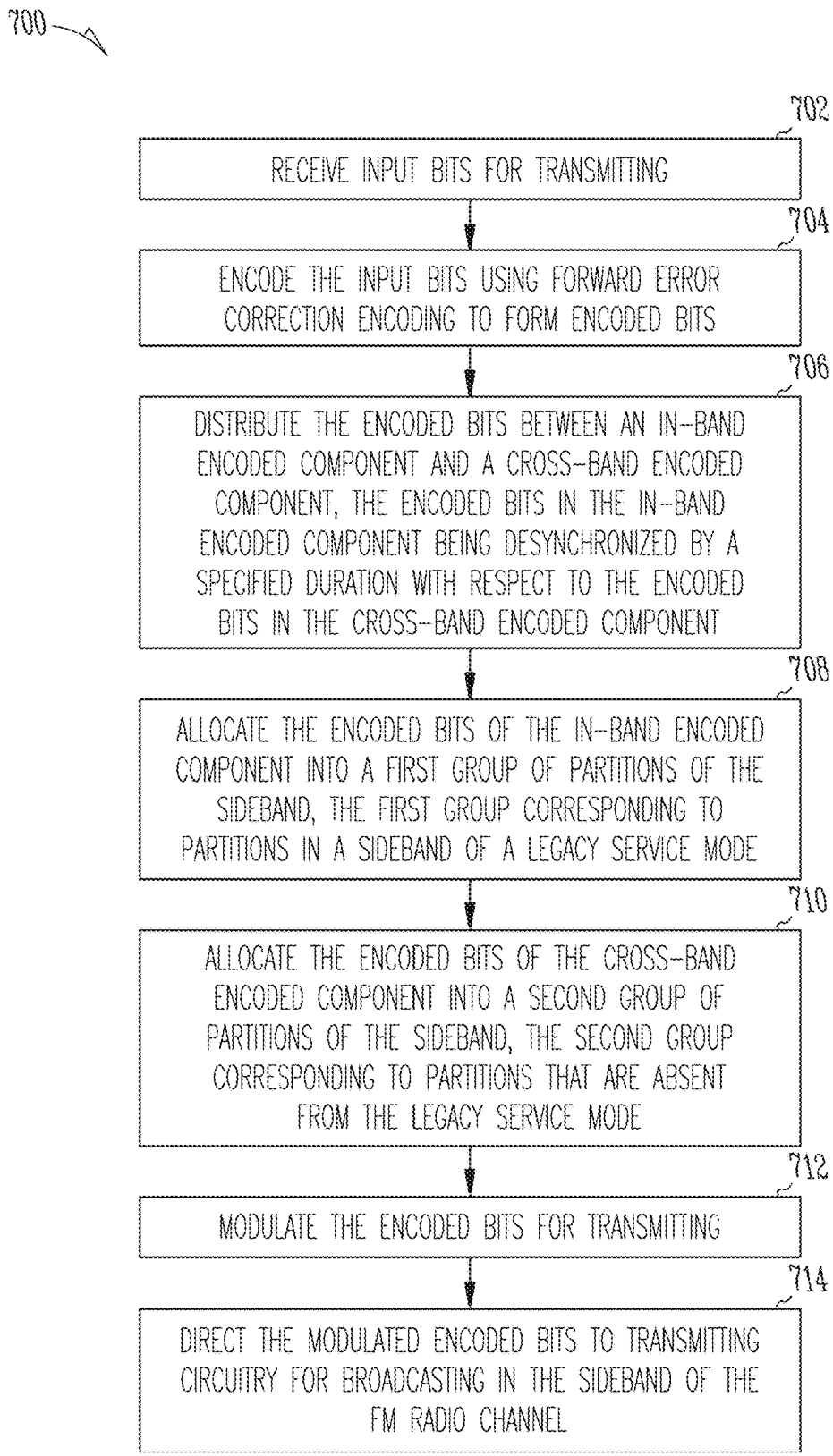
FIG. 7 shows a flow chart of an example of a method for transmitting data over a frequency modulation (FM) radio channel, in accordance with some embodiments.

FIG. 7 shows a flow chart of an example of a method 700 for transmitting data over a frequency modulation (FM) radio channel, in accordance with some embodiments. The FM radio channel can have a center frequency and a sideband. The FM radio channel can include digital data in a plurality of partitions. Each partition can be broadcast at a specified frequency within the sideband. The method 700 is but one example of a method for transmitting data over a frequency modulation (FM) radio channel; other suitable examples can also be used.

At operation 702, processing circuitry can receive input bits for transmitting.

At operation 704, the processing circuitry can encode the input bits using forward error correction encoding to form encoded bits.

At operation 706, the processing circuitry can distribute the encoded bits between an in-band encoded component and a cross-band encoded component. The encoded bits in the in-band encoded component can be desynchronized by a specified duration with respect to the encoded bits in the cross-band encoded component.

At operation 708, the processing circuitry can allocate the encoded bits of the in-band encoded component into a first group of partitions of the sideband, the first group corresponding to partitions in a sideband of a legacy service mode, such as MP1 or MP3.

At operation 710, the processing circuitry can allocate the encoded bits of the cross-band encoded component into a second group of partitions of the sideband, the second group corresponding to partitions that are absent from the legacy service mode.

At operation 712, the processing circuitry can modulate the encoded bits for transmitting.

At operation 714, the processing circuitry can direct the modulated encoded bits to transmitting circuitry for broadcasting in the sideband of the FM radio channel.

Improved Service Modes M12 and MP19

These single sideband configurations (upper or lower) maintain the MP1 existing PDU structure and data exchange from the multiplexer layer (L2) and above. Therefore, the implementation on the broadcasting side does not have to consider these layers. The physical layer (L1) can differ from that used in legacy service mode MP1, but in a way that maintains backwards compatibility with legacy MP1 receivers.

Figure 8:
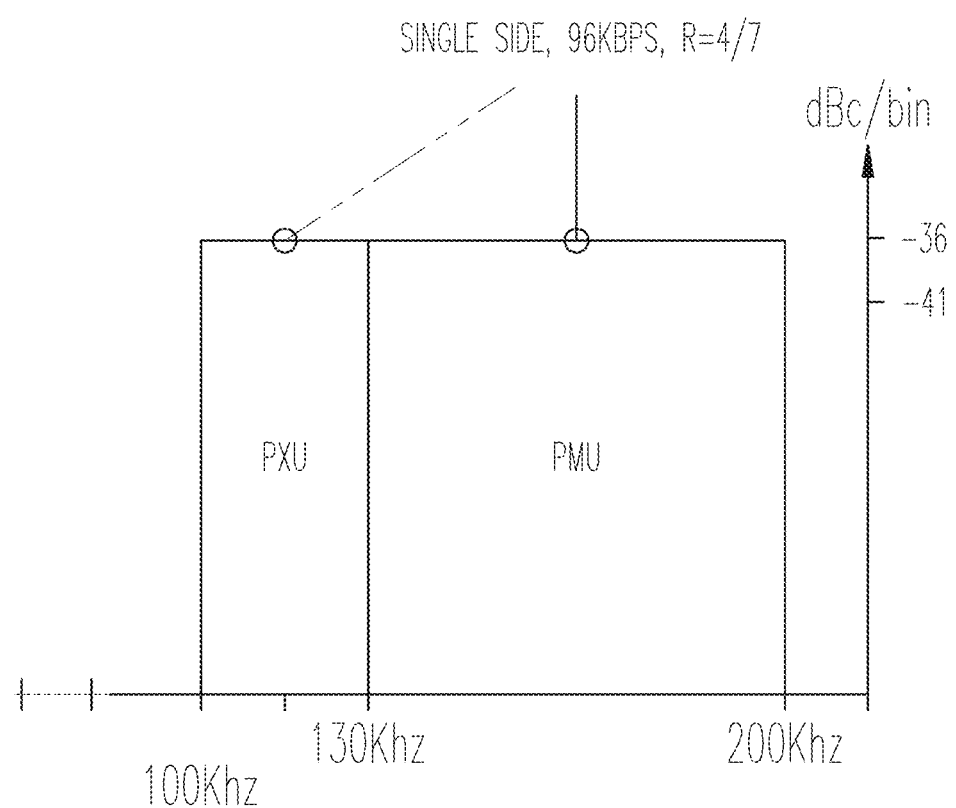
FIG. 8 shows an example of a new band for improved service mode MP12, in accordance with some embodiments.

FIG. 8 shows an example of a new band for improved service mode MP12, in accordance with some embodiments.

System mode MP12, as shown in FIG. 8 for the upper frequency side, uses a 100 kHz bandwidth sideband and provides a throughput of approximately 96 kbps. It includes the original 70 kHz sideband labeled PMU and has an added band labeled PXU. The original band PMU carries approximately 120 kbps of CPPC encoded bits, allowing for P1 channel code rate of ⅘. The additional PXU band carries approximately 48 kbps of encoded bits of the same P1 payload bits, thus allowing for P1 channel an overall code rate of 4/7. The additional PXU band is provided with an additional time diversity, in comparison to the original PMU band.

Legacy receivers that detect mode M12 default to system mode MP1. Such receivers are able to detect only the band labeled PMU and utilize ⅘ code rate, with time diversity. New receivers which can fully detect mode MP12, would fully utilize the 4/7 code rate, including time diversity.

Figure 9:
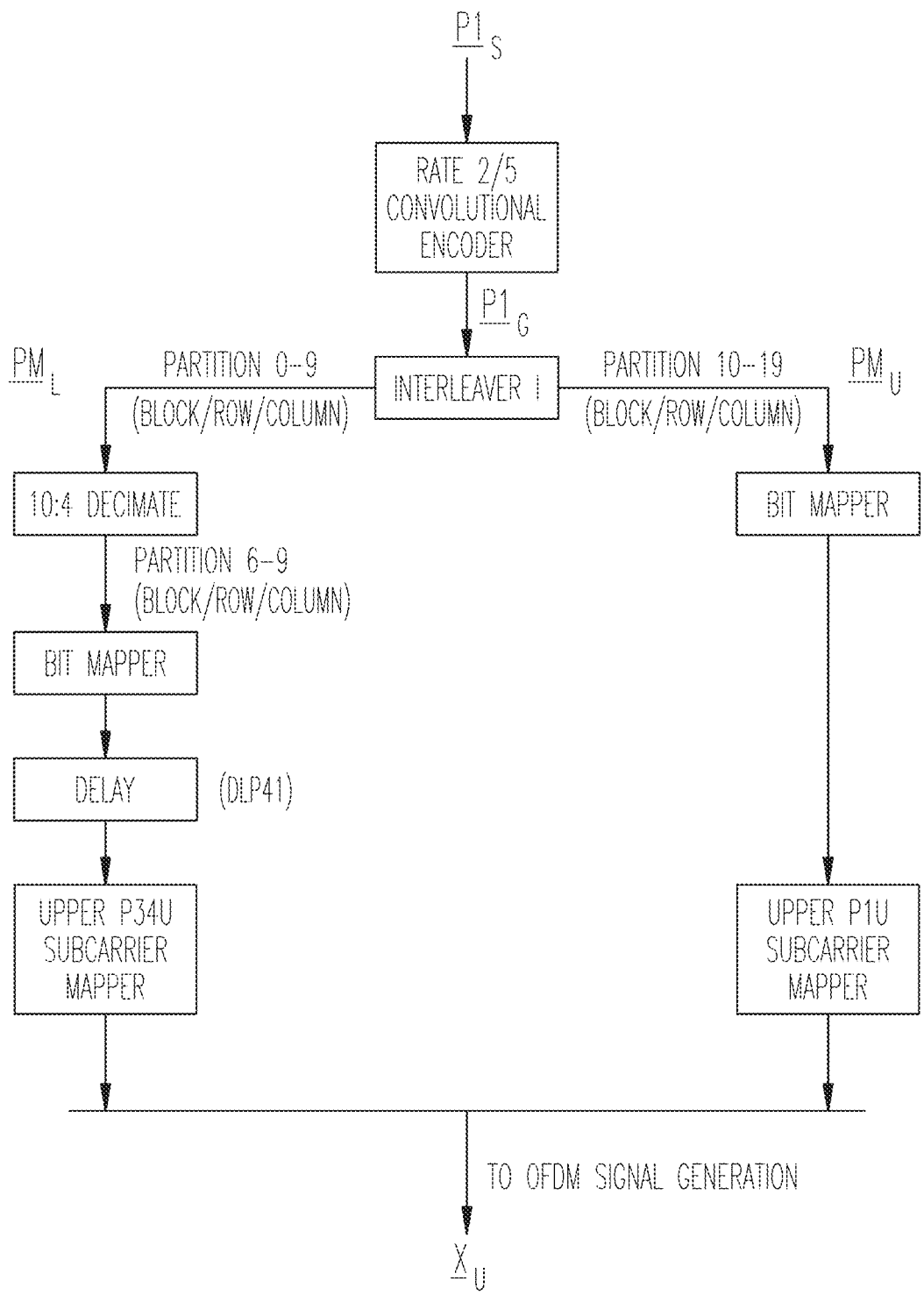
FIG. 9 shows an example of M12 encoding and interleaving, in accordance with some embodiments.

FIG. 9 shows an example of M12 encoding and interleaving, in accordance with some embodiments.

Due to MP12-to-MP1 backwards compatibility requirements, the M12 encoding and interleaving process for logical channel P1 is similar in both modes, as shown in FIG. 9 using upper band terminology. The convolutional encoding process in M12 is identical to that used for mode MP1. That encoding results in a punctured code at the rate of ⅖. The interleaving for the relevant sideband (upper or lower) in M12 is identical to the way it is applied in system mode MP1. However, that interleaving only applies to part of the encoded data. The other part is handled differently.

Figure 10:
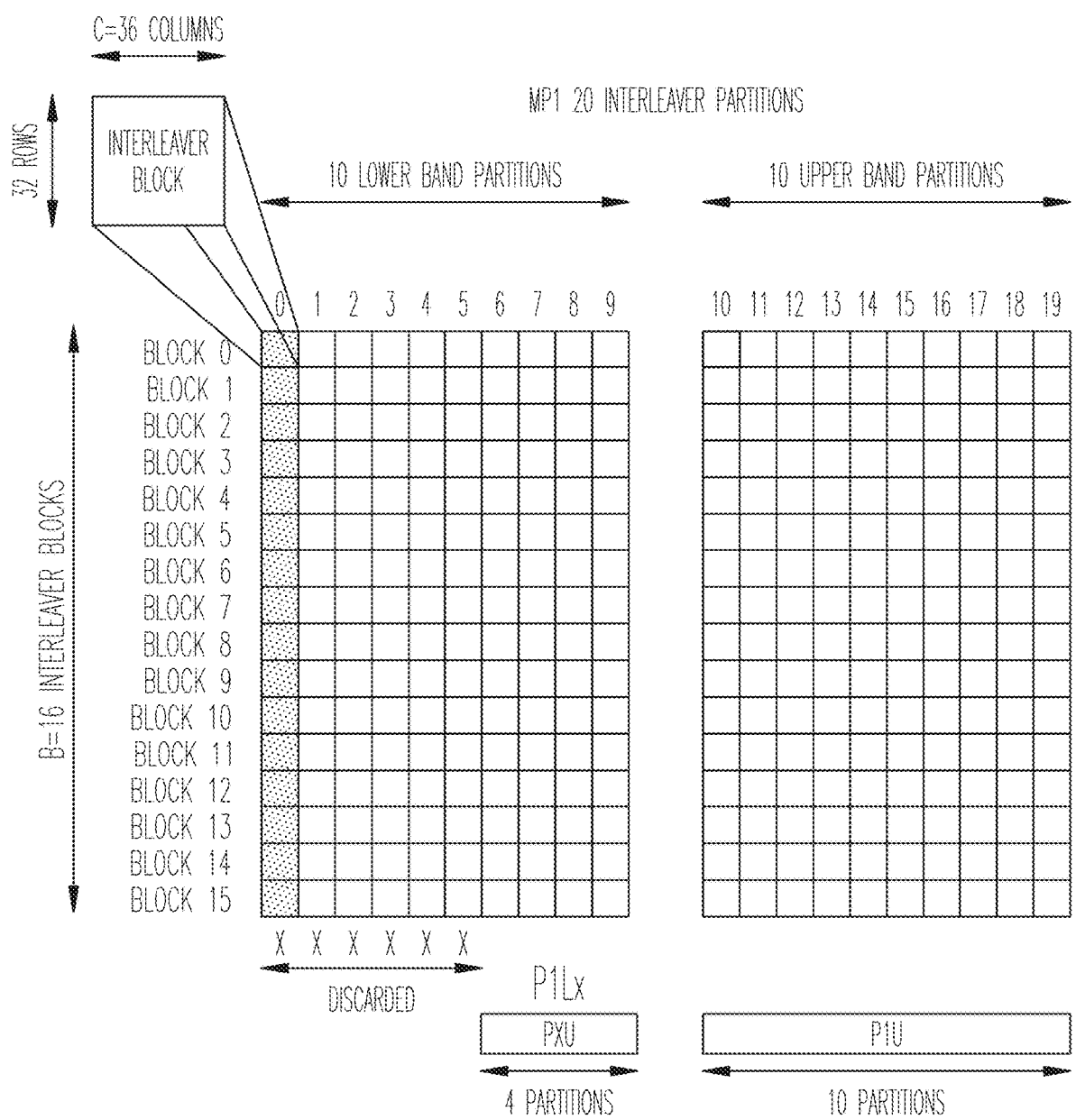
FIG. 10 shows an example of M12 interleaver and decimation, using upper band terminology, in accordance with some embodiments.

FIG. 10 shows an example of M12 interleaver and decimation, using upper band terminology, in accordance with some embodiments.

For every 10 consecutive encoded bits placed in the M12 employed sideband, while using PM interleaver equations, only 4 of the remaining bits (that were initially intended for the removed sideband comparing to mode MP1) are used and placed in the partitions of the added band PXU. These 4 bits are considered 'more important' code bits, and they were initially intended for placement in the 4 inner partitions (6 to 9 in FIG. 10) of the removed sideband. All the interleaved bits over P1 and over PXU span one modem frame.

Figure 11:
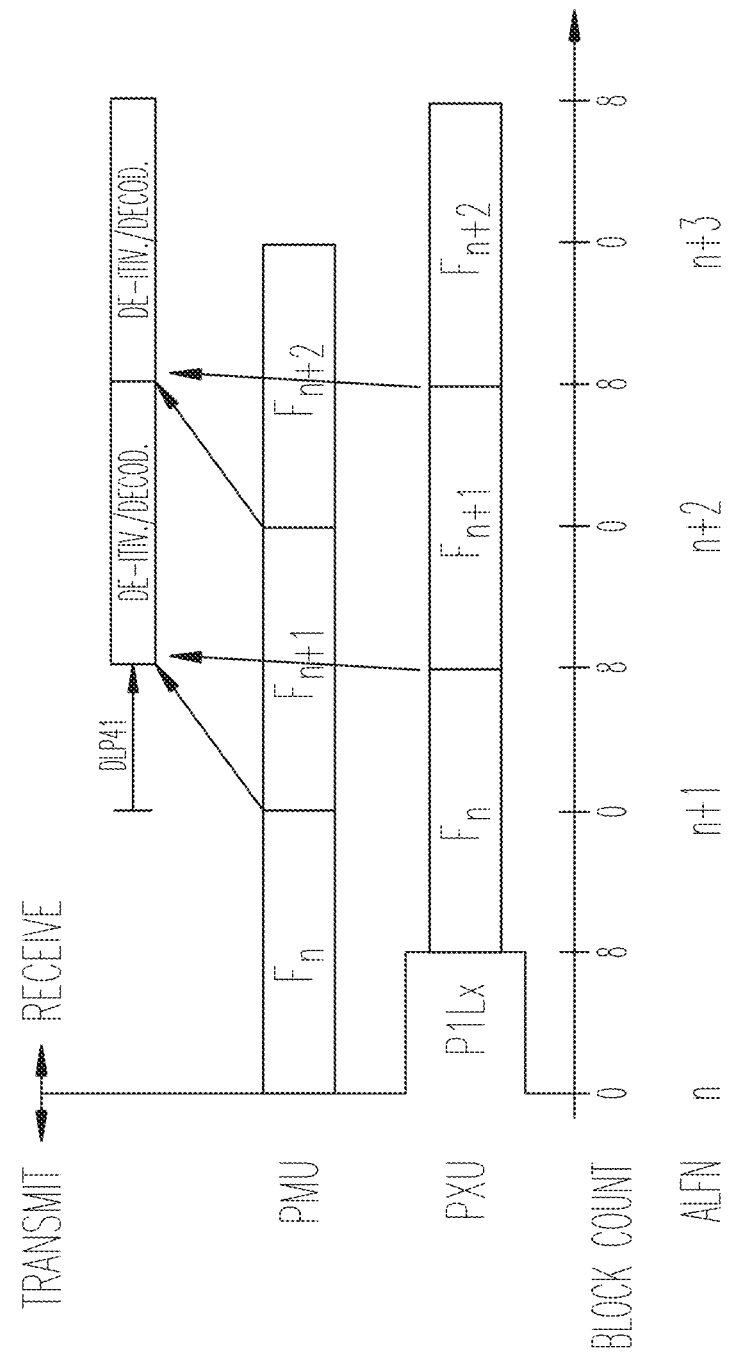
FIG. 11 shows an example of M12 diversity time delay, in accordance with some embodiments.

FIG. 11 shows an example of M12 diversity time delay, in accordance with some embodiments.

While the interleaving is still over one modem frame, the diversity delay of the remaining 4 partitions (D1p41), in comparison to the original PMU partitions, does not have to be of any specific value. That delay is initially set to 8 modem blocks (D1p41 is approximately 8*93 ms) in order to minimize (potentially eliminate) any additional acquisition delay in M12 enabled receivers, yet further increasing the robustness against temporal adverse channel conditions. Therefore, while subcarrier mapping for PMU stays aligned with modem frame boundary, subcarrier mapping for PXU (related to the same interleaver 1 cycle) starts as of modem block number 8 and continues through modem block number 7 of the consecutive modem frame.

FIG. 12 shows an example of P1 subcarrier re-mapping of the M12 upper band, in accordance with some embodiments.

FIG. 13 shows an example of P1 subcarrier re-mapping of the M12 lower band, in accordance with some embodiments.

The subcarriers in the employed band (upper or lower) are mapped identically as in system mode MP1. The re-mapping of subcarriers from the removed band (lower or upper) for M12 upper band and M12 lower band is described in FIGS. 12 and 13. In each case the 4 remaining partitions with a total of 72 subcarriers are remapped from their original mapping.

Detecting the present sideband (upper or lower) is done by choosing the sideband from which the system mode has been detected.

M12 implementation on the receiver side is reciprocal to that of the broadcasting side. Since single sideband configurations maintain the MP1 existing PDU structure and data exchange from the multiplexer layer (L2) and above, then, the implementation on the receiver side does not have to consider these layers. The receiver only needs to consider the physical layer (L1) which is different from MP1. Due to M12 backwards compatibility with MP1 legacy receivers, the differences are considered limited additions to the legacy MP1 implementation.

In order to support the time diversity for P1, on the first available frame boundary the receiver can decode and start buffering the metrics from PMU, while also starting the diversity time counting. When time diversity counting reaches Dlp41 (initially set to 8 modem blocks), the receiver can start decoding PXU and start populating the de-interleaver with metrics from both PXU and buffered PMU. The timeline is illustrated in FIG. 11.

The de-interleaving process for P1 can be the same as in mode MP1, using PM matrix and Interleaver 1 equations. The process of selecting the data for populating receiver PM matrix is reciprocal to the broadcast process described in FIG. 9. Since the broadcast process includes decimation, the receiver process can include a matching erasure insertion.

FIG. 14 shows an example of P1 soft decision mapping for service mode M12 upper band, in accordance with some embodiments.

FIG. 15 shows an example of P1 soft decision mapping for service mode M12 lower band, in accordance with some embodiments.

The data type (soft decision or erasure), the data source and guides for populating the PM matrix are listed in FIGS. 14 and 15 for mode M12 upper band and M12 lower band, respectively.

Figure 16:
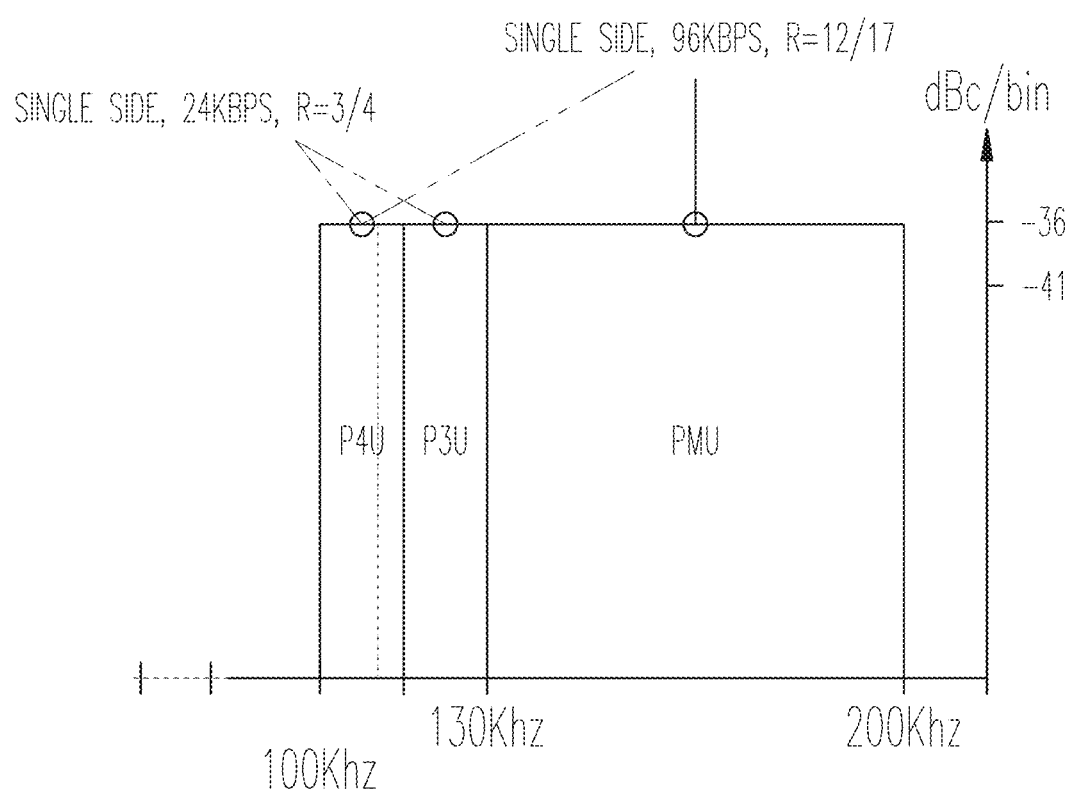
FIG. 16 shows an example of a new band for improved service mode M19, in accordance with some embodiments.

FIG. 16 shows an example of a new band for improved service mode M19, in accordance with some embodiments.

These single sideband configurations (upper or lower) maintain the MP3 existing PDU structure and data exchange from the multiplexer layer (L2) and above. Therefore, the implementation on the broadcasting side does not have to consider these layers. The physical layer (L1) is different but in a way that maintains backwards compatibility with legacy receivers.

Service mode M19, as shown in FIG. 16 for the upper frequency side, uses a 100 kHz bandwidth sideband and provides a throughput of approximately 120 kbps. It includes the original 70 kHz sideband labeled PMU, original 15 kHz sideband labeled P3U (jointly constituting the original mode MP3), and an added 15 kHz sideband (to the original mode MP3) labeled P4U. The original band PMU carries approximately 120 kbps of CPPC encoded bits, allowing for P1 channel code rate of ⅘. The original band P3U carries approximately 24 kbps of CPPC encoded bits, allowing for P3 channel code rate of 1. The additional P4U band carries approximately 24 kbps of encoded bits, combined of the same P1 and P3 payload bits, thus allowing for P1 channel an overall code rate of 12/17, and allowing for P3 channel an overall code rate of ¾.

Legacy receivers that detect mode M19 default to system mode MP3. Such receivers are able to detect only the bands labeled PMU and P3U. Therefore they will utilize P1 at a code rate of ⅘ code rate and P3 at a code rate of 1 (no redundancy).

New receivers which can fully detect mode M19, would utilize P1 at 12/17 code rate and P3 at ¾ code rate, including time diversity for both P1 and P3.

In some examples, the partitions are populated with code bits from the cross-band partitions one to ten, which are interleaved by ten-columns interleaver of which one and one-third partitions actually used and eight and two-thirds partitions are discarded. In some examples, the second group of partitions additionally includes two-thirds of a partition. In some examples, the two-thirds of a partition are populated with code bits from the cross-band partitions eleven to twelve, which are interleaved by two-columns interleaver of which two-thirds partition actually used and one and one-third partitions are discarded.

Figure 17:
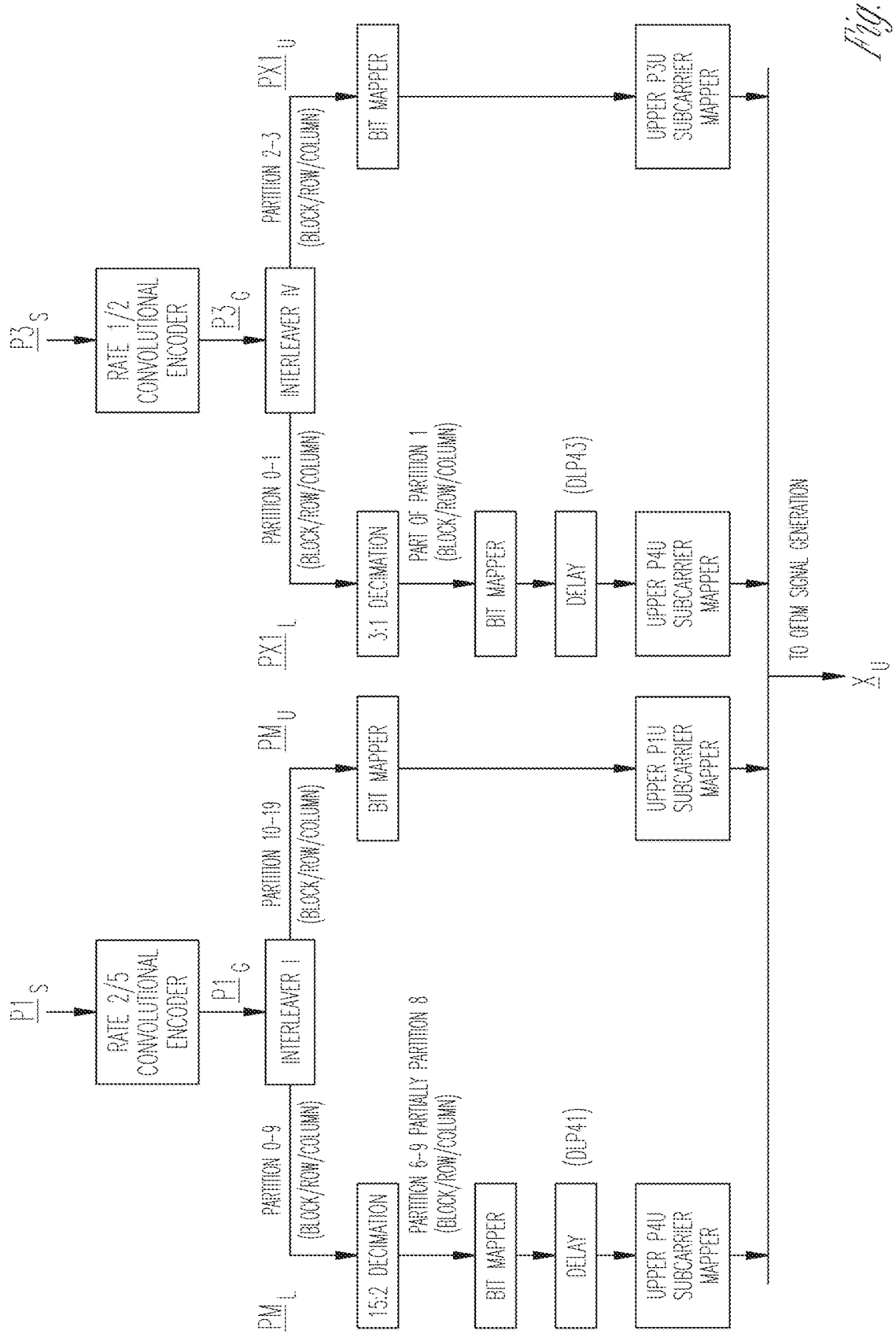
FIG. 17 shows an example of M19 encoding and interleaving, using upper band terminology, in accordance with some embodiments.

FIG. 17 shows an example of M19 encoding and interleaving, using upper band terminology, in accordance with some embodiments.

Due to M19-to-MP3 backwards compatibility requirements, encoding and interleaving for logical channels P1 and P3 in handled in M19 similarly to the way it is handled in MP3. These processes are shown in FIG. 17 using upper band terminology. The convolutional encoding process for P1 and for P3 in M19 is identical to mode MP3. That encoding results in a punctured code at the rate of ⅖ for P1 and at the rate of ½ for P3. The interleaving for the relevant sideband (upper or lower) in M19 is identical to the way it is applied in system mode MP3. However, that interleaving only applies to part of the encoded data. The other part is handled differently.

Figure 18:
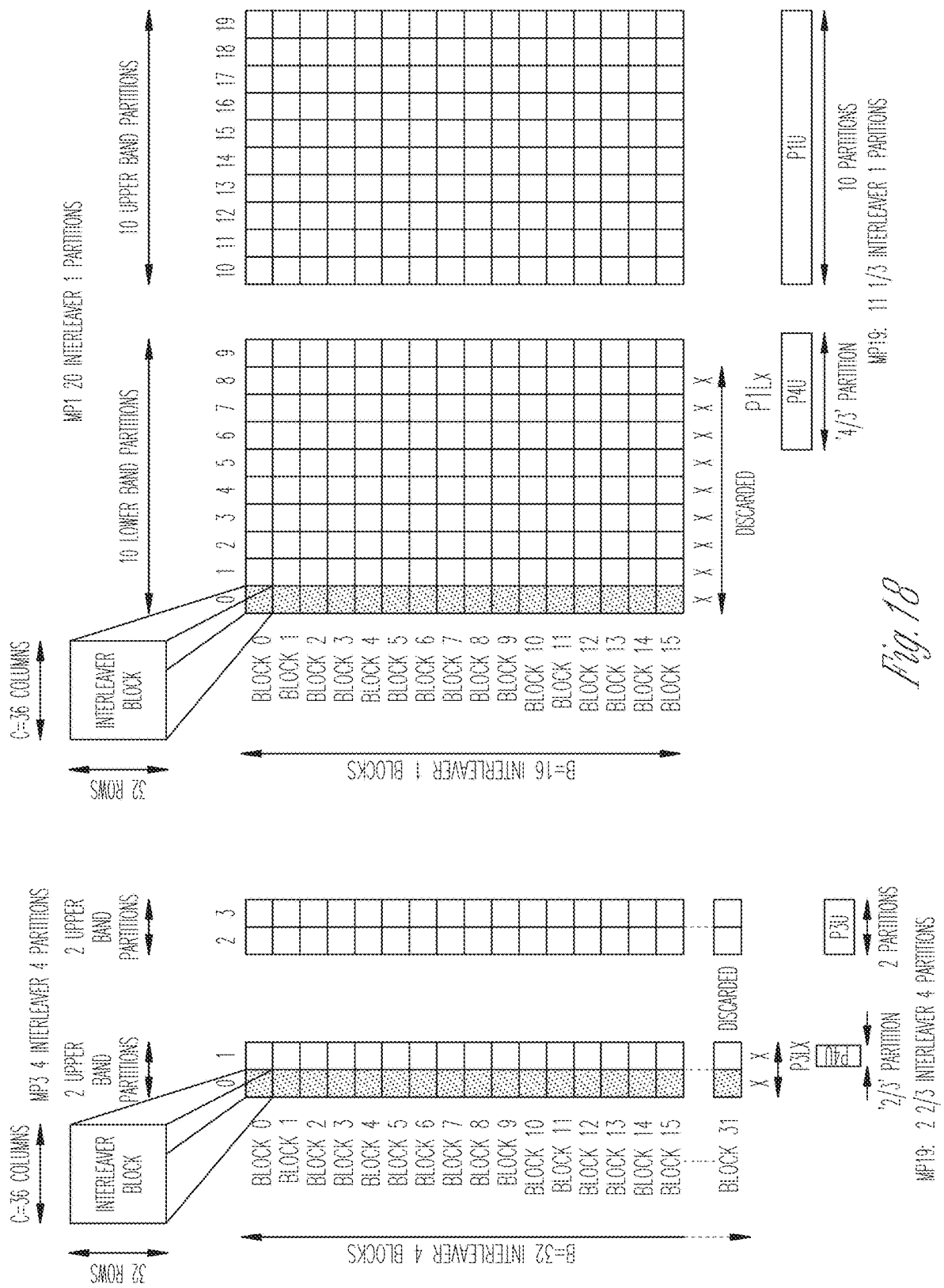
FIG. 18 shows an example of M19 interleave and decimation, using upper band terminology, in accordance with some embodiments.

FIG. 18 shows an example of M19 interleave and decimation, using upper band terminology, in accordance with some embodiments.

For every P10 consecutive encoded bits placed in the M19 employed sideband, while using PM interleaver equations, approximately only 2 of the remaining bits (that were initially intended for the removed sideband comparing to mode MP1) are used and placed in the partitions of the added band P4. These 2 bits are considered 'more important' code bits, and they were initially intended for placement in the 2 inner partitions (8-9 in FIG. 18) of the removed sideband. Of these 2 bits, the bit from most inner partition (#9) of the removed sideband is always used and placed in P4. The remaining bit, from the second inner partition (#8) in the removed sideband, is used and placed in P4 only partially, by employing only ⅓ of that bit stream and discarding ⅔ of that bit stream. This is effectively achieved by keeping only subcarriers 12 thru 17 (columns 24 thru 35 from the second inner partition (PM #8) in the removed sideband, and mapping it in P4. All the PM interleaved bits over P1 and over P4 span one modem frame.

Figure 19:
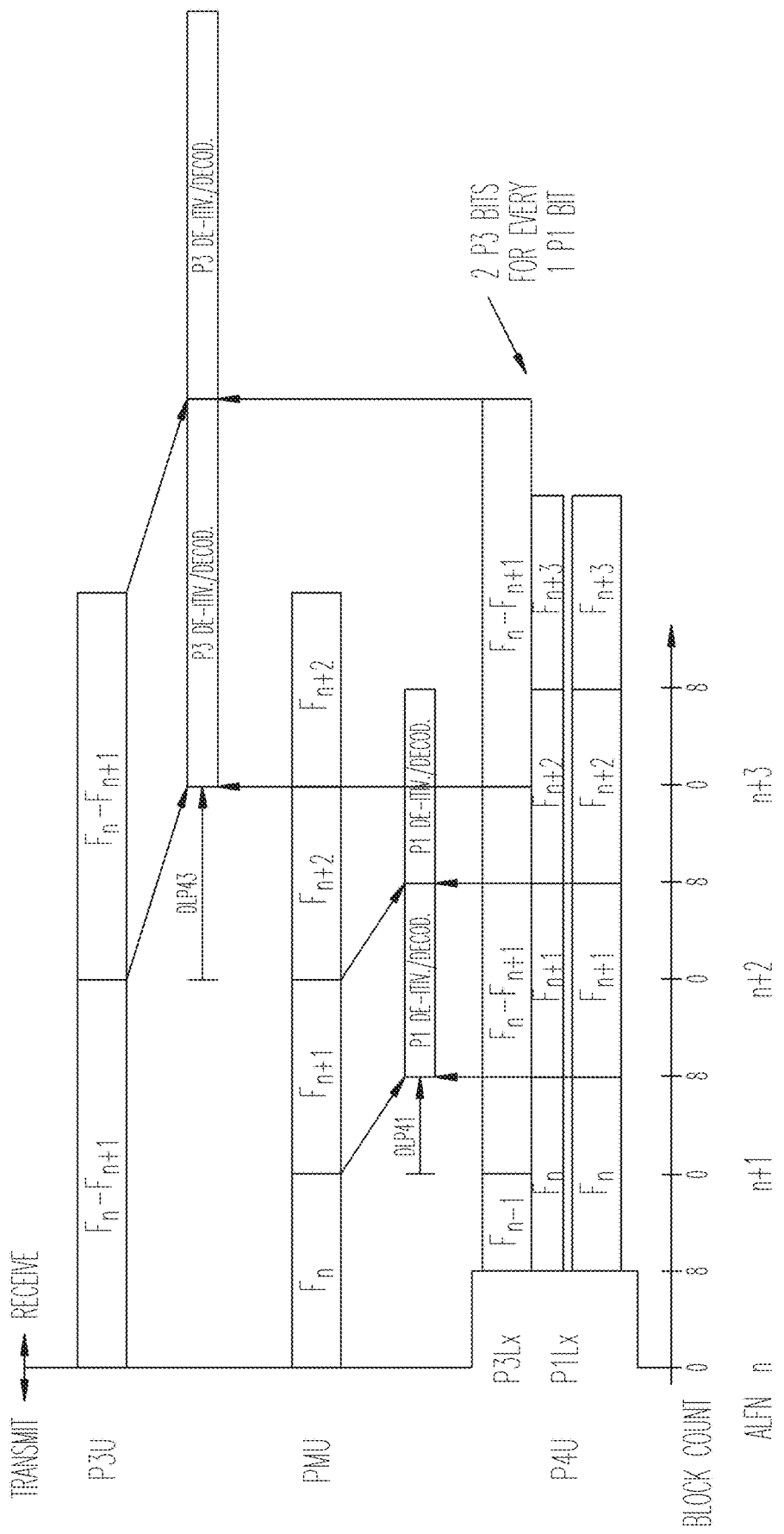
FIG. 19 shows an example of M19 diversity time delay, in accordance with some embodiments.

For every P3 2 consecutive encoded bits placed in the M19 employed sideband, while using PX1 interleaver equations, approximately only 1 of the remaining 2 bits (that were initially intended for the removed sideband comparing to mode MP3) is used and placed in a partition of the added band P4. That remaining bit is considered 'more important' code bit, and was initially intended for placement in the inner partitions (PX1 #1 in FIG. 18) of the removed sideband. That bit is used and placed in P4 only partially, by employing only ⅔ of that bit stream and discarding ⅓ of that bit stream. This is effectively achieved by keeping only subcarriers 0 thru 11 (columns 0 thru 23) from the second inner partition (PX1 #1) in the removed sideband, and mapping it in P4. All the PX1 interleaved bits over P3 and over P4 span two modem frame FIG. 19 shows an example of M19 diversity time delay, in accordance with some embodiments.

While the interleaving is still over one modem frame for P1 and over two modem frames for P3, the diversity delay of the remaining 2 partitions (Dlp41/Dlp43), in comparison to the original PMU/P3U partitions, does not have to be of any specific value. That delay is initially set to 8 modem blocks (Dlp41 is approximately 8*93 ms) for P1 bits and to one modem frame (Dlp43 is 1.486 s) for P3 bits in order to minimize (potentially eliminate) any additional acquisition delay in M19 enabled receivers, yet further increasing the robustness against temporal adverse channel conditions. Therefore, while subcarrier mapping of P1 bits for PMU stays aligned with modem frame boundary, subcarrier mapping of P1 bits for P4U (related to the same interleaver 1 cycle) starts as modem block #8 and continues through modem block #7 of the consecutive modem frame. Similarly, subcarrier mapping of P3 bits for P4U (related to the same interleaver 4 cycle) starts one modem frame later than subcarrier mapping of P3 bits for P3U, and continues through the end of the consecutive modem frame.

FIG. 20 shows an example of P1 subcarrier re-mapping of the M19 upper band, in accordance with some embodiments.

FIG. 21 shows an example of P1 subcarrier re-mapping of the M19 lower band, in accordance with some embodiments.

FIG. 22 shows an example of P3 subcarrier re-mapping of the M19 upper band, in accordance with some embodiments.

FIG. 23 shows an example of P3 subcarrier re-mapping of the M19 lower band, in accordance with some embodiments.

The subcarriers in the employed band (upper or lower) are mapped identically as in system mode MP3. The re-mapping of subcarriers from the removed band (lower or upper) for M19 upper band and M19 lower band is described in FIGS. 20-23. In each case the 2 remaining partitions with a total of 36 subcarriers are remapped from their original mapping.

Detecting the present sideband (upper or lower) is done by choosing the sideband from which the system mode has been detected.

M19 implementation on the receiver side is reciprocal to that of the broadcasting side. Since single sideband configurations maintain the MP3 existing PDU structure and data exchange from the multiplexer layer (L2) and above, then, the implementation on the receiver side does not have to consider these layers. The receiver only needs to consider the physical layer (L1) which is different from MP3. Due to M19 backwards compatibility with MP3 existing receivers, the differences are considered limited additions to the legacy MP3 implementation.

In order to support the time diversity for P1, on the first available frame boundary the receiver can decode and start buffering the metrics from PMU, while also starting the diversity time counting. When time diversity counting reaches Dlp41 (initially set to 8 modem blocks), the receiver can start decoding P4U and start populating the de-interleaver with metrics from both P4U and buffered PMU. The timeline is illustrated in FIG. 19.

FIG. 24 shows an example of P1 soft decision mapping for service mode M19 upper band, in accordance with some embodiments.

FIG. 25 shows an example of P3 soft decision mapping for service mode M19 upper band, in accordance with some embodiments.

FIG. 26 shows an example of P1 soft decision mapping for service mode M19 lower band, in accordance with some embodiments.

FIG. 27 shows an example of P3 soft decision mapping for service mode M19 lower band, in accordance with some embodiments.

The de-interleaving process for P1 can be the same as in mode MP3, using PM matrix and Interleaver 1 equations. The process of selecting the data for populating receiver PM matrix is reciprocal to the broadcast process described in FIG. 17. Since the broadcast process includes decimation, the receiver process can include a matching erasure insertion. The data type (soft decision or erasure), the data source and guides for populating the PM matrix are listed in FIGS. 24-27.

In order to support the time diversity for P3, on the first available block-pair boundary the receiver can decode and start buffering the metrics from P3U, while also starting the diversity time counting. When time diversity counting reaches Dlp43 (initially set to 1 modem frame), the receiver can start decoding P4U and start populating the de-interleaver with metrics from both P4U and buffered P3U. The timeline is illustrated in FIG. 19.

The de-interleaving process for P3 can be the same as in mode MP3, using PX1 matrix and Interleaver 4 equations. The process of selecting the data for populating receiver PX1 matrix is reciprocal to the broadcast process described in FIG. 16. Since the broadcast process includes decimation, the receiver process can include a matching erasure insertion. The data type (soft decision or erasure), the data source and guides for populating the PX1 matrix are listed in FIGS. 25 and 27 for mode M19 upper band and M19 lower band, respectively.

It is possible to include M12 sidebands on both the upper and lower sidebands, or M19 sidebands on both the upper and lower sidebands.

Regarding encoding, no encoding changes are applied to bits in logical channels P1, P3, and P4 which carry the old content and are required to maintain backwards compatibility.

The new content may be encoded by using the same encoding mechanism as used for the original content. However, due to employing higher coding rates additional puncturing is applied at the encoding stage. It results in producing smaller PDU per modem block and/or per modem frame and exchanging smaller PDU with the consecutive processing stages in comparison to the original content. It also allows new receivers for using less memory when applying the reciprocal processing of the new content, in comparison with the memory required for the processing the original (old) content.

Regarding interleaving, one can use a convolutional interleaver, with two (selectable) time-span modes. A first mode can use 4 blocks for fast acquisition and live broadcast (referred to as ball-game mode) allowing up to 1 second delay. A second mode can use 1 modem frame for long error-spread when short delay is not essential.

Many other variations than those described herein will be apparent from this document. For example, depending on the embodiment, certain acts, events, or functions of any of the methods and algorithms described herein can be performed in a different sequence, can be added, merged, or left out altogether (such that not all described acts or events are necessary for the practice of the methods and algorithms). Moreover, in certain embodiments, acts or events can be performed concurrently, such as through multi-threaded processing, interrupt processing, or multiple processors or processor cores or on other parallel architectures, rather than sequentially. In addition, different tasks or processes can be performed by different machines and computing systems that can function together.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Embodiments of the automatic room acoustics correction system and method described herein are operational within numerous types of general purpose or special purpose computing system environments or configurations. In general, a computing environment can include any type of computer system, including, but not limited to, a computer system based on one or more microprocessors, a mainframe computer, a digital signal processor, a portable computing device, a personal organizer, a device controller, a computational engine within an appliance, a mobile phone, a desktop computer, a mobile computer, a tablet computer, a smartphone, and appliances with an embedded computer, to name a few.

Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, and so forth. In some embodiments the computing devices will include one or more processors. Each processor may be a specialized microprocessor, such as a digital signal processor (DSP), a very long instruction word (VLIW), or other micro-controller, or can be conventional central processing units (CPUs) having one or more processing cores, including specialized graphics processing unit (GPU)-based cores in a multi-core CPU.

The process actions or operations of a method, process, or algorithm described in connection with the embodiments of the automatic room acoustics correction system and method disclosed herein can be embodied directly in hardware, in a software module executed by a processor, or in any combination of the two. The software module can be contained in computer-readable media that can be accessed by a computing device. The computer-readable media includes both volatile and nonvolatile media that is either removable, non-removable, or some combination thereof. The computer-readable media is used to store information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as Bluray discs (BD), digital versatile discs (DVDs), compact discs (CDs), floppy disks, tape drives, hard drives, optical drives, solid state memory devices, RAM memory, ROM memory, EPROM memory, EEPROM memory, flash memory or other memory technology, magnetic cassettes, magnetic tapes, magnetic disk storage, or other magnetic storage devices, or any other device which can be used to store the desired information and which can be accessed by one or more computing devices.

A software module can reside in the RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an application specific integrated circuit (ASIC). The ASIC can reside in a user terminal. Alternatively, the processor and the storage medium can reside as discrete components in a user terminal.

The phrase "non-transitory" as used in this document means "enduring or long-lived". The phrase "non-transitory computer-readable media" includes any and all computer-readable media, with the sole exception of a transitory, propagating signal. This includes, by way of example and not limitation, non-transitory computer-readable media such as register memory, processor cache and random-access memory (RAM).

The phrase "audio signal" is a signal that is representative of a physical sound.

Retention of information such as computer-readable or computer-executable instructions, data structures, program modules, and so forth, can also be accomplished by using a variety of the communication media to encode one or more modulated data signals, electromagnetic waves (such as carrier waves), or other transport mechanisms or communications protocols, and includes any wired or wireless information delivery mechanism. In general, these communication media refer to a signal that has one or more of its characteristics set or changed in such a manner as to encode information or instructions in the signal. For example, communication media includes wired media such as a wired network or direct-wired connection carrying one or more modulated data signals, and wireless media such as acoustic, radio frequency (RF), infrared, laser, and other wireless media for transmitting, receiving, or both, one or more modulated data signals or electromagnetic waves. Combinations of the any of the above should also be included within the scope of communication media.

Further, one or any combination of software, programs, computer program products that embody some or all of the various embodiments of the automatic room acoustics correction system and method described herein, or portions thereof, may be stored, received, transmitted, or read from any desired combination of computer or machine readable media or storage devices and communication media in the form of computer executable instructions or other data structures.

Embodiments of the automatic room acoustics correction system and method described herein may be further described in the general context of computer-executable instructions, such as program modules, being executed by a computing device. Generally, program modules include routines, programs, objects, components, data structures, and so forth, which perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the scope of the disclosure. As will be recognized, certain embodiments of the automatic room acoustics correction system and method described herein can be embodied within a form that does not provide all of the features and benefits set forth herein, as some features can be used or practiced separately from others.

EXAMPLES

To further illustrate the device and related method disclosed herein, a non-limiting list of examples is provided below. Each of the following non-limiting examples can stand on its own, or can be combined in any permutation or combination with any one or more of the other examples.

In Example 1, a radio transmitter can include: transmitting circuitry configured to broadcast over a frequency modulation (FM) radio channel, the FM radio channel having a center frequency and a sideband, the FM radio channel including digital data in a plurality of partitions, each partition being broadcast at a specified frequency within the sideband; and processing circuitry configured to: receive input bits for transmitting; encode the input bits using forward error correction encoding to form encoded bits; distribute the encoded bits between an in-band encoded component and a cross-band encoded component, the encoded bits in the in-band encoded component being desynchronized by a specified duration with respect to the encoded bits in the cross-band encoded component; allocate the encoded bits of the in-band encoded component into a first group of partitions of the sideband, the first group corresponding to partitions in a sideband of an MP1 service mode; allocate the encoded bits of the cross-band encoded component into a second group of partitions of the sideband, the second group corresponding to partitions that are absent from the MP1 service mode; modulate the encoded bits for transmitting; and direct the modulated encoded bits to the transmitting circuitry for broadcasting in the sideband of the FM radio channel.

In Example 2, the radio transmitter of Example 1 can optionally be configured such that the desynchronization provides a time diversity to the data in the sideband.

In Example 3, the radio transmitter of any one of Examples 1-2 can optionally be configured such that the plurality of partitions broadcast at the specified frequencies within the sideband provides a frequency diversity to the data in the sideband.

In Example 4, the radio transmitter of any one of Examples 1-3 can optionally be configured such that the first group of partitions of the sideband extends from 130 kHz away from the center frequency to 200 kHz away from the center frequency.

In Example 5, the radio transmitter of any one of Examples 1-4 can optionally be configured such that the first group of partitions includes ten partitions.

In Example 6, the radio transmitter of any one of Examples 1-5 can optionally be configured such that the second group of partitions of the sideband extends from 100 kHz away from the center frequency to 130 kHz away from the center frequency.

In Example 7, the radio transmitter of any one of Examples 1-6 can optionally be configured such that the second group of partitions includes four partitions.

In Example 8, the radio transmitter of any one of Examples 1-7 can optionally be configured such that when received by a legacy MP1 service mode receiver, the legacy MP1 service mode receiver: interprets the FM radio channel as being in the MP1 service mode; interprets encoded bits that are present in the first group of partitions of the FM radio channel; and does not interpret encoded bits that are present in the second group of partitions of the FM radio channel.

In Example 9, the radio transmitter of any one of Examples 1-8 can optionally be configured such that the encoded bits in the first and second groups of partitions are encoded at a code rate of $4/7$; the encoded bits in the first and second groups of partitions, together, have a data rate of 96 kbps.

In Example 10, a radio transmitter can include: transmitting circuitry configured to broadcast over a frequency modulation (FM) radio channel, the FM radio channel having a center frequency and a sideband, the FM radio channel including digital data in a plurality of partitions, each partition being broadcast at a specified frequency within the sideband; and processing circuitry configured to: receive input bits for transmitting; encode the input bits using forward error correction encoding to form encoded bits; distribute the encoded bits between an in-band encoded component and a cross-band encoded component, the encoded bits in the in-band encoded component being desynchronized by a specified duration with respect to the encoded bits in the cross-band encoded component; allocate the encoded bits of the in-band encoded component into a first group of partitions of the sideband, the first group corresponding to partitions in a sideband of an MP3 service mode; allocate the encoded bits of the cross-band encoded component into a second group of partitions of the sideband, the second group corresponding to partitions that are absent from the MP3 service mode; modulate the encoded bits for transmitting; and direct the modulated encoded bits to the transmitting circuitry for broadcasting in the sideband of the FM radio channel.

In Example 11, the radio transmitter of Example 10 can optionally be configured such that desynchronization provides a time diversity to the data in the sideband.

In Example 12, the radio transmitter of any one of Examples 10-11 can optionally be configured such that the plurality of partitions broadcast at the specified frequencies within the sideband provides a frequency diversity to the data in the sideband.

In Example 13, the radio transmitter of any one of Examples 10-12 can optionally be configured such that the first group of partitions of the sideband extends from 115 kHz away from the center frequency to 200 kHz away from the center frequency.

In Example 14, the radio transmitter of any one of Examples 10-13 can optionally be configured such that the first group of partitions includes twelve and two-thirds partitions.

In Example 15, the radio transmitter of any one of Examples 10-14 can optionally be configured such that the second group of partitions of the sideband extends from 100 kHz away from the center frequency to 115 kHz away from the center frequency.

In Example 16, the radio transmitter of any one of Examples 10-15 can optionally be configured such that the second group of partitions includes one and one-third partitions.

In Example 17, the radio transmitter of any one of Examples 10-16 can optionally be configured such that when received by a legacy MP3 service mode receiver, the legacy MP3 service mode receiver: interprets the FM radio channel as being in the MP3 service mode; interprets encoded bits that are present in the first group of partitions of the FM radio channel; and does not interpret encoded bits that are present in the second group of partitions of the FM radio channel.

In Example 18, the radio transmitter of any one of Examples 10-17 can optionally be configured such that the encoded bits for ten of the twelve partitions of the first group of partitions and one and one-third partitions of the second groups of partitions are encoded at a combined code rate of $12/17$ and have a service data rate of 96 kbps; the encoded bits for two of the twelve partitions of the first group of partitions and two-thirds partition of the second groups of partitions are encoded at a combined code rate of $3/4$ and have a service data rate of 24 kbps; and the encoded bits in the first and second groups of partitions, together, have a service data rate of 120 kbps.

In Example 19, a method for transmitting data over a frequency modulation (FM) radio channel, the FM radio channel having a center frequency and a sideband, the FM radio channel including digital data in a plurality of partitions, each partition being broadcast at a specified frequency within the sideband, the method can include: receiving, with processing circuitry, input bits for transmitting; encoding, with the processing circuitry, the input bits using forward error correction encoding to form encoded bits; distributing, with the processing circuitry, the encoded bits between an in-band encoded component and a cross-band encoded component, the encoded bits in the in-band encoded component being desynchronized by a specified duration with respect to the encoded bits in the cross-band encoded component; allocating, with the processing circuitry, the encoded bits of the in-band encoded component into a first group of partitions of the sideband, the first group corresponding to partitions in a sideband of a legacy service mode; allocating, with the processing circuitry, the encoded bits of the cross-band encoded component into a second group of partitions of the sideband, the second group corresponding to partitions that are absent from the legacy service mode; modulating, with the processing circuitry, the encoded bits for transmitting; and directing, with the processing circuitry, the modulated encoded bits to transmitting circuitry for broadcasting in the sideband of the FM radio channel.

In Example 20, the method of claim 19 can optionally be configured such that the legacy service mode comprises one of an MP1 service mode or an MP3 service mode.

GLOSSARY

Absolute L1 Frame Number (ALFN): A number assigned to each transmitted L1 frame that provides a reference to absolute time. The start of ALFN 0 occurred at 00:00:00 Coordinated Universal Time (UTC) on Jan. 6, 1980. The start of every subsequent L1 frame occurs at an integer multiple of Tf after that instant in time.

All Digital waveform: The transmitted waveform composed entirely of digitally modulated subcarriers (subcarriers −546 to +546) without an analog FM signal. Use of this waveform will normally follow an initial transitional phase utilizing Hybrid waveforms incorporating both analog and digital modulation. (See Hybrid waveform and Extended Hybrid waveform.)

Allocated channel: One of the one hundred possible frequency assignments in the FM band.

Amplitude modulation (AM): Modulation in which the amplitude of a carrier wave is varied in accordance with the amplitude of the modulating signal.

Amplitude scale factor: A factor which multiplies the baseband components of a particular OFDM subcarrier of the transmitted spectrum to constrain the radiated power to a prescribed level.

Analog signal: Refers to signals that are modulated on the main carrier by conventional high-modulation-index frequency modulation. (See digital signal.)

BC range: The range of L1 Blocks, M1:m2, spanned by a transfer frame, indicating its position within an L1 frame.

Binary phase shift keying (BPSK): A form of digital phase modulation that assigns one of two discrete phases, differing by 180 degrees, to the carrier. Each BPSK symbol conveys one bit of information.

Channel encoding: The process used to add redundancy to each of the logical channels to improve the reliability of the transmitted information.

Characterization parameters: The unique set of defining parameters for each logical channel for a given service mode. The channel encoding, interleaving, spectral mapping, and diversity delay of the logical channel determine its characterization parameters.

Code rate: Defines the increase in overhead on a coded channel resulting from channel encoding. It is the ratio of information bits to the total number of bits after coding.

Column pair: Bits from adjacent columns in an interleaver partition that represent the I and Q bit pair to map to a QPSK symbol.

Convolutional encoding: A form of forward-error-correction channel encoding that inserts coding bits into a continuous stream of information bits to form a predictable structure. Unlike a block encoder, a convolutional encoder has memory; its output is a function of current and previous inputs.

Configuration Administrator: The Configuration Administrator is a system function that configures each of the layers using SCCH information or parameters which do not change often.

Differential encoding: Encoding process in which signal states are represented as changes to succeeding values rather than absolute values.

Digital signal: Refers to signals that are digitally modulated on subcarriers by OFDM (q.v.). (See analog signal.)

Diversity delay: Imposition of a fixed time delay in one of two channels carrying the same information to defeat non-stationary channel impairments such as fading and impulsive noise.

Extended Hybrid waveform: The transmitted waveform composed of the analog FM signal plus digitally modulated primary main subcarriers (subcarriers +356 to +546 and −356 to −546) and some or all primary extended subcarriers (subcarriers +280 to +355 and −280 to −355). This waveform will normally be used during an initial transitional phase preceding conversion to the All Digital waveform. (See All Digital waveform and Hybrid waveform.)

Fading: The variation (with time) of the amplitude or relative phase (or both) of one or more frequency components of a received signal.

Frequency modulation (FM): Modulation in which the instantaneous frequency of a sine wave carrier is caused to depart from the channel center frequency by an amount proportional to the instantaneous amplitude of the modulating signal.

Frequency partition: A group of 19 OFDM subcarriers containing 18 data subcarriers and one reference subcarrier.

Hybrid waveform: The transmitted waveform composed of the analog FM-modulated signal, plus digitally modulated Primary Main subcarriers (subcarriers +356 to +546 and −356 to −546). This waveform will normally be used during an initial transitional phase preceding conversion to the All Digital waveform. (See All Digital waveform and Extended Hybrid waveform.)

Interleaver block: A logical subdivision of an interleaver partition. Each interleaver block contains 32 rows and C columns (where C=24, or C=36).

Interleaver depth: The number of rows in an interleaver matrix. The system employs three interleaver depths: L1 block (32 rows); L1 block pair (64 rows); L1 frame (512 rows); L1 frame pair (1024 rows).

Interleaver matrix: A two-dimensional array containing the output of an interleaving process.

Interleaver partition: A logical subdivision of the overall interleaver matrix. Each interleaver partition contains C columns (C=24 or 36) and 32·B rows where B is the number of interleaver blocks.

Interleaving: A reordering of the message bits to distribute them in time (over different OFDM symbols) and frequency (over different OFDM subcarriers) to mitigate the effects of signal fading and interference.

Interleaving process: A series of manipulations performed on one or more coded transfer frames (vectors) to reorder their bits into one or more interleaver matrices whose contents are destined for a particular portion of the transmitted spectrum.

L1 block: A unit of time of duration Tb. Each L1 frame is comprised of 16 L1 blocks.

L1 Block Count: An index that indicates one of 16 equal subdivisions of an L1 frame.

L1 block pair: Two contiguous L1 blocks. A unit of time duration Tp.

L1 block pair rate: The rate, equal to the reciprocal of the L1 block pair duration, (1/Tp), at which selected transfer frames are conducted through Layer 1.

L1 block rate: The rate, equal to the reciprocal of the L1 block duration, (1/Tb), at which selected transfer frames are conducted through Layer 1.

L1 frame: A specific time slot of duration Tf identified by an ALFN. The transmitted signal may be considered to consist of a series of L1 frames.

L1 frame pair: Two contiguous L1 frames. A unit of time duration 2·Tf

L1 frame rate: The rate, equal to the reciprocal of the L1 frame duration, (1/Tf), at which selected transfer frames are conducted through Layer 1.

Latency: The time delay that a logical channel imposes on a transfer frame as it traverses Layer 1. One of the three characterization parameters. (See robustness and transfer.)

Layer 1 (L1): The lowest protocol layer in the HD Radio Protocol Stack (also known as the waveform/transmission layer). Primarily concerned with the transmission of data over a communication channel. Includes framing, channel coding, interleaving, modulation, etc. over the FM radio link at the specified service mode.

Layer 2 (L2): The Channel Mux layer in the HD Radio Protocol Stack. Multiplexes data from the higher layer services into logical channels (partitioned into L1 frames, block pairs, and blocks) for processing in Layer 1.

Layer 2 protocol data units (L2 PDUs): Units of user content and upper layer protocol control information transferred from Layer 2 to Layer 1.

Logical channel: A signal path that conducts transfer frames from Layer 2 through Layer 1 with a specified grade of service.

Lower sideband: The group of OFDM subcarriers (subcarriers number −1 through −546) below the carrier frequency.

Mother code: The complete code sequence generated by a convolutional encoder. (See puncturing.)

Mother codeword: A code sequence generated by a convolutional encoder. (See puncturing.)

OFDM Signal Generation: The function that generates the modulated baseband signal in the time domain.

OFDM subcarrier: A discrete frequency-domain signal within the allocated channel that encodes digital data through its amplitude and/or phase. The total set of subcarriers, taken in aggregate for a period of Ts, provides the digital data for that time interval. (See OFDM symbol.)

OFDM Subcarrier Mapping: The function that assigns the interleaved logical channels (interleaver partitions) to the OFDM subcarriers (frequency partitions).

OFDM symbol: Time domain pulse of duration Ts, representing all the active subcarriers and containing all the data in one row from the interleaver and system control data sequence matrices. The transmitted waveform is the concatenation of successive OFDM symbols.

Orthogonal Frequency Division Multiplexing (OFDM): A parallel multiplexing scheme that modulates a data stream onto a large number of orthogonal subcarriers that are transmitted simultaneously. (See OFDM symbol.)

Parity: In binary-coded data, a condition maintained so that in any permissible coded expression, the total number of "1"s or "0"s is always odd, or always even.

Primary Extended (PX) sideband: The portion of the primary sideband that holds the additional frequency partitions (1, 2, or 4) inside the main partitions in the FM Extended Hybrid and All Digital waveforms. It consists, at most, of subcarriers 280 through 355 and −280 through −355.

Primary Main (PM) sidebands: The ten partitions in the primary sideband consisting of subcarriers 356 through 545 and −356 through −545.

Protocol Data Unit (PDU): A Protocol Data Unit (PDU) is the structured data block in the HD Radio system that is produced by a specific layer (or process within a layer) of the transmitter protocol stack. The PDUs of a given layer may encapsulate PDUs from the next higher layer of the stack and/or include content data and protocol-control information originating in the layer (or process) itself. The PDUs generated by each layer (or process) in the transmitter protocol stack are inputs to a corresponding layer (or process) in the receiver protocol stack.

Pulse-shaping function: A time-domain pulse superimposed on the OFDM symbol to improve its spectral characteristics.

Puncturing: The process of removing selected bits from the mother codeword to increase FEC code rate.

Quadrature Phase Shift Keying (QPSK): A form of digital phase modulation that assigns one of four discrete phases, differing by 90 degrees, to the carrier. Each QPSK symbol conveys two bits of information.

Reference subcarrier: A dedicated OFDM subcarrier in L1 of the HD Radio system used to convey L1 system control and status information contained in the system control data sequence. The number of reference subcarriers broadcast in a given waveform depends on the service mode. Reference subcarriers are typically used by receivers as an acquisition and synchronization aid.

Robustness: The ability of a logical channel to withstand channel impairments such as noise, interference, and fading. There are eleven distinct levels of robustness designed into Layer 1 of the FM air interface. One of the three characterization parameters. (See latency and transfer.)

Scrambling: The process of modulo 2 summing the input data bits with a pseudo-random bit stream to randomize the time domain bit stream.

Secondary sidebands: The sidebands to be added in the spectrum vacated by the analog signal. The secondary sidebands are divided into the Secondary Main (SM) sidebands containing ten frequency partitions, Secondary Extended (SX) sidebands containing four frequency partitions and the Secondary Protected (SP) sidebands containing two groups of twelve protected subcarriers. The secondary sidebands consist of subcarriers −279 through +279.

Service mode: A specific configuration of operating parameters specifying throughput, performance level, and selected logical channels.

Signal Constellation Mapper: The function in OFDM Subcarrier Mapping that associates I, Q bit pairs with specific QPSK states, or associates single bits from R with specific BPSK states.

Spectral emissions mask: A specification setting the maximum level of out-of-band components of the transmitted signal.

Spectral mapping: The association of specific logical channels with specific subcarriers or groups of subcarriers.

Submatrix: A matrix extracted from a larger matrix; one or more of its dimensions is less than that of the larger matrix System control: Data from the Configuration Administrator conveying control such as service mode, primary amplitude scale factors, and secondary amplitude scale factor select.

System Control Channel (SCCH): A channel which transports control information from the Configuration Administrator to Layer 1 and also conveys status information from Layer 1 to Layer 2, through the system control processing.

System control data sequence: A sequence of bits destined for each reference subcarrier representing the various system control components relayed between the Configuration Administrator and Layer 1.

System control processing: The function that generates the system control data sequence.

System protocol stack: The protocols associated with operation of the layers of the HD Radio system.

System time alignment, Tst: Internal time delay to absorb variations in internal processing time to maintain message alignment with L1 blocks Frames.

Transfer: A measure of the data throughput through a logical channel. One of the three characterization parameters. (See latency and robustness.)

Transfer frame: An ordered, one-dimensional collection of data bits of specified length grouped for processing through a logical channel for exchange with the physical layer.

Transfer frame modulus: The number of transfer frames in an L1 frame.

Transfer frame multiplexer: A device that combines two or more transfer frames into a single vector.

Transfer frame number: A number, F n, that specifies the ALFN, n, and BC range, M1:m2, associated with a particular transfer frame, in order to relate the transfer frame to absolute time.

Transfer frame rate: The number of transfer frames per second.

Transfer frame size: The number of bits in a transfer frame.

Transmission subsystem: The functional component used to format and up-convert the baseband HD Radio waveform for transmission through the very-high frequency (VHF) channel.

Transmit time alignment, TT1a: An adjustment applied to make the digital time diversity between P1 and P1' and S1 and S1' be precisely Tdd at the transmit antenna.

Transmit audio alignment, TT5a: Adjusted so that the audio content in the analog and digital paths has a time diversity of precisely Tad at the TX antenna (applies to hybrid service modes only)

Upper sideband: The group of OFDM subcarriers (subcarrier numbers 0 through +546) above the carrier frequency.

Vector: A one-dimensional array.

What is claimed is:

1. A radio transmitter, comprising:
transmitting circuitry configured to broadcast over a frequency modulation (FM) radio channel, the FM radio channel having a center frequency and a sideband, the FM radio channel including digital data in a plurality of partitions, each partition being broadcast at a specified frequency within the sideband; and
processing circuitry configured to:
receive input bits for transmitting;
encode the input bits using forward error correction encoding to form encoded bits;
distribute the encoded bits between an in-band encoded component and a cross-band encoded component, the encoded bits in the in-band encoded component being desynchronized by a specified duration with respect to the encoded bits in the cross-band encoded component;
allocate the encoded bits of the in-band encoded component into a first group of partitions of the sideband, the first group corresponding to partitions in a sideband of a service mode that specifies how digital content is formatted in sidebands of the FM radio channel;
allocate the encoded bits of the cross-band encoded component into a second group of partitions of the sideband, the second group corresponding to partitions that are absent from the service mode;
modulate the encoded bits for transmitting; and
direct the modulated encoded bits to the transmitting circuitry for broadcasting in the sideband of the FM radio channel.

2. The radio transmitter of claim 1, wherein the service mode includes an MP1 service mode and the first group of partitions of the sideband extends from 130 kHz away from the center frequency to 200 kHz away from the center frequency.

3. The radio transmitter of claim 2, wherein the first group of partitions includes ten partitions.

4. The radio transmitter of claim 1, wherein the service mode includes an MP1 service mode and the second group of partitions of the sideband extends from 100 kHz away from the center frequency to 130 kHz away from the center frequency.

5. The radio transmitter of claim 4, wherein the second group of partitions includes four partitions.

6. The radio transmitter of claim 1, wherein the service mode includes an MP1 service mode; and
wherein, when received by a legacy MP1 service mode receiver, the legacy MP1 service mode receiver:
interprets the FM radio channel as being in the MP1 service mode;
interprets encoded bits that are present in the first group of partitions of the FM radio channel; and
does not interpret encoded bits that are present in the second group of partitions of the FM radio channel.

7. The radio transmitter of claim 1, wherein the service mode includes an MP1 service mode; and wherein:
the encoded bits in the first and second groups of partitions are encoded at a code rate of 4/7;
the encoded bits in the first and second groups of partitions, together, have a data rate of 96 kbps.

8. The radio transmitter of claim 1, wherein the service mode includes an MP3 service mode.

9. The radio transmitter of claim 8, wherein the desynchronization provides a time diversity to the data in the sideband.

10. The radio transmitter of claim 8, wherein the plurality of partitions broadcast at the specified frequencies within the sideband provides a frequency diversity to the data in the sideband.

11. The radio transmitter of claim 8, wherein the first group of partitions of the sideband extends from 115 kHz away from the center frequency to 200 kHz away from the center frequency.

12. The radio transmitter of claim 11, wherein the first group of partitions includes twelve and two-thirds partitions.

13. The radio transmitter of claim 8, wherein the second group of partitions of the sideband extends from 100 kHz away from the center frequency to 115 kHz away from the center frequency.

14. The radio transmitter of claim 13, wherein the second group of partitions includes one and one-third partitions.

15. The radio transmitter of claim 8, wherein, when received by a legacy MP3 service mode receiver, the legacy MP3 service mode receiver:
   interprets the FM radio channel as being in the MP3 service mode;
   interprets encoded bits that are present in the first group of partitions of the FM radio channel; and
   does not interpret encoded bits that are present in the second group of partitions of the FM radio channel.

16. The radio transmitter of claim 8, wherein:
   the encoded bits for ten of the twelve partitions of the first group of partitions and one and one-third partitions of the second groups of partitions are encoded at a combined code rate of $12/17$ and have a service data rate of 96 kbps;
   the encoded bits for two of the twelve partitions of the first group of partitions and two-thirds partition of the second groups of partitions are encoded at a combined code rate of $3/4$ and have a service data rate of 24 kbps; and
   the encoded bits in the first and second groups of partitions, together, have a service data rate of 120 kbps.

17. A method for transmitting data over a frequency modulation (FM) radio channel, the FM radio channel having a center frequency and a sideband, the FM radio channel including digital data in a plurality of partitions, each partition being broadcast at a specified frequency within the sideband, the method comprising:
   receiving, with processing circuitry, input bits for transmitting;
   encoding, with the processing circuitry, the input bits using forward error correction encoding to form encoded bits;
   distributing, with the processing circuitry, the encoded bits between an in-band encoded component and a cross-band encoded component, the encoded bits in the in-band encoded component being desynchronized by a specified duration with respect to the encoded bits in the cross-band encoded component;
   allocating, with the processing circuitry, the encoded bits of the in-band encoded component into a first group of partitions of the sideband, the first group corresponding to partitions in a sideband of a legacy service mode;
   allocating, with the processing circuitry, the encoded bits of the cross-band encoded component into a second group of partitions of the sideband, the second group corresponding to partitions that are absent from the legacy service mode;
   modulating, with the processing circuitry, the encoded bits for transmitting; and
   directing, with the processing circuitry, the modulated encoded bits to transmitting circuitry for broadcasting in the sideband of the FM radio channel.

18. The method of claim 17, wherein the legacy service mode comprises one of an MP1 service mode or an MP3 service mode.

* * * * *